United States Patent
Bestler et al.

(10) Patent No.: US 10,216,577 B2
(45) Date of Patent: Feb. 26, 2019

(54) MULTICAST RAID: DISTRIBUTED PARITY PROTECTION

(71) Applicant: Nexenta Systems, Inc., Santa Clara, CA (US)

(72) Inventors: Caitlin Bestler, Sunnyvale, CA (US); Alexander Aizman, Mountain View, CA (US)

(73) Assignee: Nexenta Systems, Inc., Santa Clara, CA (US)

( * ) Notice: Subject to any disclaimer, the term of this patent is extended or adjusted under 35 U.S.C. 154(b) by 203 days.

(21) Appl. No.: 15/210,501

(22) Filed: Jul. 14, 2016

(65) Prior Publication Data
US 2018/0018229 A1 Jan. 18, 2018

(51) Int. Cl.
*G06F 11/10* (2006.01)
*G06F 3/06* (2006.01)

(52) U.S. Cl.
CPC .......... *G06F 11/1076* (2013.01); *G06F 3/064* (2013.01); *G06F 3/067* (2013.01); *G06F 3/0619* (2013.01)

(58) Field of Classification Search
CPC .. G06F 11/1092; G06F 11/1076; G06F 3/067; G06F 3/0619; G06F 3/064
See application file for complete search history.

(56) References Cited

U.S. PATENT DOCUMENTS

| 7,904,782 | B2 * | 3/2011 | Huang | ............... | H03M 13/1191 |
| | | | | | 714/752 |
| 7,930,611 | B2 * | 4/2011 | Huang | ............... | H03M 13/1191 |
| | | | | | 714/752 |
| 2002/0048284 | A1 | 4/2002 | Moulton | | |
| 2002/0091897 | A1 | 7/2002 | Chiu | | |
| 2005/0125562 | A1 | 6/2005 | Bhardwaj | | |
| 2012/0084506 | A1 | 4/2012 | Colgrove | | |
| 2013/0041872 | A1 | 2/2013 | Aizman | | |
| 2016/0057226 | A1 * | 2/2016 | Bestler | ................ | G06F 11/1076 |
| | | | | | 709/217 |

FOREIGN PATENT DOCUMENTS

WO 2014 116875 A2 7/2014

* cited by examiner

*Primary Examiner* — Phung M Chung
(74) *Attorney, Agent, or Firm* — DLA Pier LLP (US)

(57) ABSTRACT

The present invention introduces a specific form of parity protection chunk (PPC) that allows for distributed creation of coordinated PPCs that can reliably provide protection against the concurrent loss of two or more storage servers of devices. Coordinated PPCs can protect against the concurrent loss of multiple lost chunks by ensuring that the PPCSs protecting any specific chunk have at most a single overlapping failure domain. This is done without requiring full centralized control over the assignment of protected chunks to specific PPCs. The PPCs are created as part of the put transaction for a chunk. The chunk itself is stored as a whole replica, and the PPCs provide parity protection for the chunk.

3 Claims, 20 Drawing Sheets

Open PPC
With 3 Failure
Domains that
could be
potentially
assigned

MULTICAST RAID: DISTRIBUTED PARITY PROTECTION

TECHNICAL FIELD

The present invention relates generally to use of parity protection to protect against loss of data stored in distributed storage clusters, particularly those which rely upon multicast negotiations to assign storage chunks to specific servers and to find them later for retrieval.

BACKGROUND OF THE INVENTION

This application builds upon the inventions by Applicant disclosed in the following patents and applications:
- U.S. Pat. No. 9,344,287, which was filed on Dec. 3, 2013 and titled "SCALABLE TRANSPORT SYSTEM FOR MULTICAST REPLICATION"; U.S. patent application Ser. No. 14/095,839, which was filed on Dec. 3, 2013 and titled "SCALABLE TRANSPORT METHOD FOR MULTICAST REPLICATION"; and U.S. patent application Ser. No. 14/095,848, which was filed on Dec. 3, 2013 and titled "SCALABLE TRANSPORT WITH CLIENT-CONSENSUS RENDEZVOUS" (together, the "Replicast Applications");
- U.S. patent application Ser. No. 14/312,282, which was filed on Jun. 23, 2014 and titled "KEY/VALUE STORAGE DEVICE AND METHOD" ("KVT Application"); and
- U.S. Utility patent application Ser. No. 15/137,920, which was filed on Apr. 25, 2016 and titled "PARITY PROTECTION FOR DATA CHUNKS IN AN OBJECT STORAGE SYSTEM" ("Manifest Striping Application").
- The Replicast Applications, KVT Application, and Manifest Striping Application are each incorporated by reference herein and referred to collectively as the "Incorporated References."
  a. A Replicast Storage System With reference now to existing relevant art developed by Applicant, FIG. 1 depicts storage system 100 described in the Incorporated References. Storage system 100 comprises clients 110a, 110b, . . . 110i (where i is any integer value), which access initiator/application layer gateway 130 over client access network 120. It will be understood by one of ordinary skill in the art that there can be multiple gateways and client access networks, and that gateway 130 and client access network 120 are merely exemplary. Gateway 130 in turn accesses replicast network 140, which in turn accesses storage servers 150a, 150b, 150c, 150d, . . . 150k (where k is any integer value). Each of the storage servers 150a, 150b, 150c, 150d, . . . 150k is coupled to a plurality of storage devices 160a, 160b, . . . 160k, respectively.

In this patent application the terms "initiator", "application layer gateway", or simply "gateway" refer to the same type of devices and are used interchangeably.

FIG. 2 depicts a typical put transaction in storage system 100 to store chunk 220. As discussed in the Incorporated References, groups of storage servers are maintained, which are referred to as "negotiating groups." Here, exemplary negotiating group 210a is depicted, which comprises ten storage servers, specifically, storage servers 150a-150j. When a put command is received, gateway 130 assigns the put transaction to a negotiating group. In this example, the put chunk 220 transaction is assigned to negotiating group 210a. It will be understood by one of ordinary skill in the art that there can be multiple negotiating groups on storage system 100, and that negotiating group 210a is merely exemplary, and that each negotiating group can consist of any number of storage servers and that the use of ten storage servers is merely exemplary.

Gateway 130 then engages in a protocol with each storage server in negotiating group 210a to determine which three storage servers should handle the put request. The three storage servers that are selected are referred to as a "rendezvous group." As discussed in the Incorporated References, the rendezvous group comprises three storage servers so that the data stored by each put transaction is replicated and stored in three separate locations, where each instance of data storage is referred to as a replica. Applicant has concluded that three storage servers provide an optimal degree of replication for this purpose, but any other number of servers could be used instead.

In varying embodiments, the rendezvous group may be addressed by different methods, all of which achieve the result of limiting the entities addressed to the subset of the negotiating group identified as belonging to the rendezvous group. These methods include:
- Selecting a matching group from a pool of pre-configured multicast groups each holding a different subset combination of members from the negotiating group;
- Using a protocol that allows each UDP message to be addressed to an enumerated subset of the total group. An example of such a protocol would be the BIER protocol currently under development by the IETF; and
- Using a custom control protocol which allows the sender to explicitly specify the membership of a target multicast group as being a specific subset of an existing multicast group. Such a control protocol was proposed in an Internet Draft submitted to the IETF titled "Creation of Transactional Multicast Groups" and dated Mar. 23, 2015, a copy of which is being submitted with this application and is incorporated herein by reference.

In FIG. 3, gateway 130 has selected storage servers 150b, 150e, and 150g as rendezvous group 310a to store chunk 220.

In FIG. 4, gateway 130 transmits the put command for chunk 220 to rendezvous group 310a. This is a multicast operation. In this example, three replicas of chunk 220 will be stored (labeled as replicas 401a, 401b, and 401c).

b. Mechanisms to Recover Data when Disk Drives Fail

In a well-known aspect of the prior art, storage servers such as storage servers 150a . . . 150k often utilize physical disk drives. However, disk drives are unreliable. They break. The connections to them break. The servers that access them break. For a storage cluster containing a significant number of disk drives, drive failures are predictable routine events, not exceptional errors. Having a single persistently stored copy of some data does not mean that the data is saved persistently. It is only safe until something loses or blocks access to that replica.

There are several prior art strategies to ensure that data is truly saved persistently. These include creating multiple whole replicas of the data, RAID encoding, and Erasure Coding. Each of these strategies increases the probability of successfully retaining data higher compared to a system that retains only a single replica or slice.

All of these data protection methods can be characterized by the number of slices or chunks being protected (N) and the number of additional slices or chunks that protect the data (M). The total size written is N+M, and the data for any N of the slices can be recovered. The different methods vary in how much overhead is required (the ratio of M to N) and the complexity of creating and using the parity protection data.

c. Replica System

An example of a prior art replica system 500 is shown in FIG. 5. Replica system 500 comprises drive array 510. In this example, drive array 510 comprises three drives (Drive 1, Drive 2, and Drive 3). Each data block that is written as part of a put command is stored once in each drive. Thus, when block $A_1$ is stored, it is stored three times, once in each drive. Creating three whole replicas is a 1:2 scheme. There are three total chunks (1+2), any one of which can recover the original (since each drive stored an exact copy of the original).

d. Parity Protection Systems

Protecting data from the loss of storage devices without fully replicating content has long been a feature of storage systems. Techniques include RAID-5, RAID-6, software RAID and Erasure Coding.

These techniques can be characterized as N:M schemes, where N payload slices are protected by adding M parity slices. Depending on the encoding algorithm used the N payload chunks may be unaltered while the parity protection is encoded in M additional chunks, or the payload and parity protection may be spread over all N+M chunks. An N:M encoding allows recovery of the original data after the loss of up to M slices.

The Manifest Striping Application details a method for efficiently and safely converting an object from whole replica protection to parity protection. One of the motivations for delayed conversion was the assumption that writing the payload chunks and parity protection sets at ingest would consume more network bandwidth than simply multicasting the payload alone.

As explained in the Manifest Striping Application, ingesting new content with whole replica protection is desirable because whole replicas provide the best latency on probable retrievals and because only a single copy of the new content had to be multicast to create enough copies to provide the desired level of data protection (typically against the loss of two drives or servers). It was only later after the probability of read access to the content was low that it was worthwhile to convert to a parity protection scheme.

The whole replica protection strategy is desirable when the extra whole replicas will optimize likely retrieval of the just put object version. It is of less value when the same bandwidth can create a single replica and two parity protectors where the parity protectors can restore the protected chunk. Depending on the precise parity protection scheme the parity protectors may be parity slices protecting payload slices, parity chunks protection payload chunks or for the present invention a "parity protector" which contains both a manifest of the protected chunks and the product payload. The parity protection slices or chunks contain just the product payload and are described elsewhere.

All of these schemes protect against the concurrent loss of two servers or chunks the while using the same storage to protect N payload chunks, greatly reducing the total storage required.

Additional detail regarding the embodiments of the Manifest Striping Application is shown in FIGS. 6A, 6B, and 6C.

FIG. 6A depicts a replica technique for various chunks. Manifest 610 (labeled as Manifest A) refers to payload chunks 601, 603, and 605 (labeled Payload Chunks C, D, and E), and manifest 620 (labeled as Manifest B) refers to payload chunks 601, 603, and 607.

It is common for different manifests to refer to some of the same payload chunks when the underlying objects are related, as might be the case when they are portions of two versions of the same file. In this particular example, perhaps manifest 610 is associated with a first draft of a word processing document, and manifest 620 is associated with a second draft of the same word processing document, and payload chunks 601 and 603 are the portions of the document that have not changed from one version to the next.

In this example, manifest 610 has three replicas (represented by the two additional boxes underneath the box for manifest 610). Payload chunks 601, 603 and 605 also have three replicas each (represented by the boxes underneath each payload chunk). The relationships between manifests and referenced chunks are between the conceptual chunks, not between the specific replicas. The second replica of Manifest 610 has chunk references to payload chunks 601, 603 and 605. These same references are in the first and third replica of Manifest 610. The chunk references specify the chunk IDs of payload chunks 601, 603 and 605. The reference does not specify a specific replica or any specific location.

There are back-reference lists associated with each of the payload chunks. These back-references are to the manifest chunk by its chunk ID. They do not reference a specific replica.

With reference to FIG. 6B, when it is desirable to switch from a replica system to a parity system for this particular data set (such as for the reasons described with respect to FIG. 12, below), the effective replication count for manifests are not altered. Therefore, there will still be three replicas of each of the manifest chunks. There will also be whole replica protection for the parity protection content manifests. A back-reference from each created parity protection chunk references the chunk ID of the parity protection content manifest. This prevents the parity protection chunk from being expunged while it is referenced in a parity protection content manifest.

With reference to FIG. 6C, when it is desirable to switch from a parity system to a replica system for this particular data set (such as for the reasons described with respect to FIG. 12, below), the effective replication count from the manifest to the referenced payload chunks will be restored to the number of whole replicas desired. This will cause the storage servers to begin replicating the whole referenced payload chunks until there are the desired number of whole replicas. Concurrently, the parity protection content manifest may be expunged after the parity protection chunks are no longer required to protect the object version's payload from the designated number of target losses. Alternately, an implementation may elect to retain the parity protection even while carrying full replica protection if return to parity protection is anticipated to occur relatively soon.

Protecting stored data with error correction codes or parity of stored data has been well known art in the data storage since before the 1990s. This has extended from purely hardware solutions and to more sophisticated parity algorithms.

U.S. Pat. No. 5,499,253 A "System and method for calculating RAID 6 check codes" (Lary) discloses a method for calculating multiple checksums from the same set of protected data stripes. RAID-6 enables protection from the loss of two drives, in contrast to RAID-5 which only protected from the loss of a single drive.

Sun Microsystems' RAID-Z, as disclosed in "RAID-Z" in "Jeff Bonwick's Blog" on Nov. 17, 2005, uses an encoding equivalent to RAID-5 under software control where the data is striped over drives that no longer have any mandated fixed physical relationship to each other. RAID-Z was subsequently extended to RAID-Zn to provide for protection against the loss of more than one drive concurrently.

U.S. Pat. No. 8,316,260, "Method and System for Multi-Dimensional RAID" (Bonwick), describes a method for a RAID controller to assign blocks to a data grid where different rows and columns are used to identify multiple non-overlapping 'parity groups'. The present invention uses a different technique to assign non-overlapping parity protection groups. The present invention has different steps and avoids centralizing assignment of blocks to parity groups or sets.

U.S. Patent Application No. 2004/0160975, "Multicast communications protocols, systems and methods" (Frank), discloses an application of multicast updating of a RAID stripe where multicast communications is used to allow the delta to the parity stripe to be updated without requiring the entire payload to be read. This relates to optimal updating of a volatile RAID encoding where each write updates the existing data.

Multicast communications are also used in various schemes where RAID encoding is used to enable error recovery at the receiving end for long haul video-on-demand systems. RAID encoding is bandwidth inefficient compared to forward-error-correction (FEC) techniques. Use of RAID algorithms is mostly described for older solutions where there were concerns about the CPU requirements for FEC error correction. Erasure coding and/or network coding are now favored as solutions for reliable multicast delivery over drop-prone networks where explicit per receiver acknowledgement is undesirable or infeasible. RFC 3453 ("The Use of Forward Error Correction (FEC) in Reliable Multicast"), dated December 2002, describes both simple FEC and erasure coding as techniques to detect and correct transmission errors for multicast transmission. These approaches are not relevant to multicast delivery within a data center network where transmission errors are exceedingly rare.

What the above-described systems lack is the ability to perform a put operation on a new data chunk with parity protection while using only the data bandwidth required for a single multicast transmission of the new content. The present invention seeks to retain the benefits of multicast chunk distribution while efficiently creating parity protected data. This would be useful, for example, when the system knows that the data to be saved is likely to be "cold" from the outset, as might be the case if the system is storing, as might be the case for email saved in a SPAM folder, an archive created by a backup utility, or a draft document.

SUMMARY OF THE INVENTION

The present invention introduces a specific form of a parity protection conglomerate (PPC) which allows for distributed creation of coordinated PPCs that can reliably provide protection against the concurrent loss of two or more failure domains containing storage servers of devices. In the simplest well-known case, a PPC calculated from a set of protected chunks can recover any single missing chunk. This protects against the loss of a chunk replica with far less storage required than would be required creating whole replicas. The present invention allows for distributed creation of multiple PPCs as a by-product of delivering the protected chunks to multiple targets. Coordinated PPCs can protect against the concurrent loss of multiple lost chunks by ensuring that the PPCs protecting any specific chunk have at most a single overlapping failure domain. This is done without requiring full centralized control over the assignment of protected chunks to specific PPCs. Further, a method is disclosed for drive recovery from PPCs which is an extension of the prior multicast get request under the Replicast protocol as disclosed in the Incorporated References.

DEFINITIONS

Figure 1:
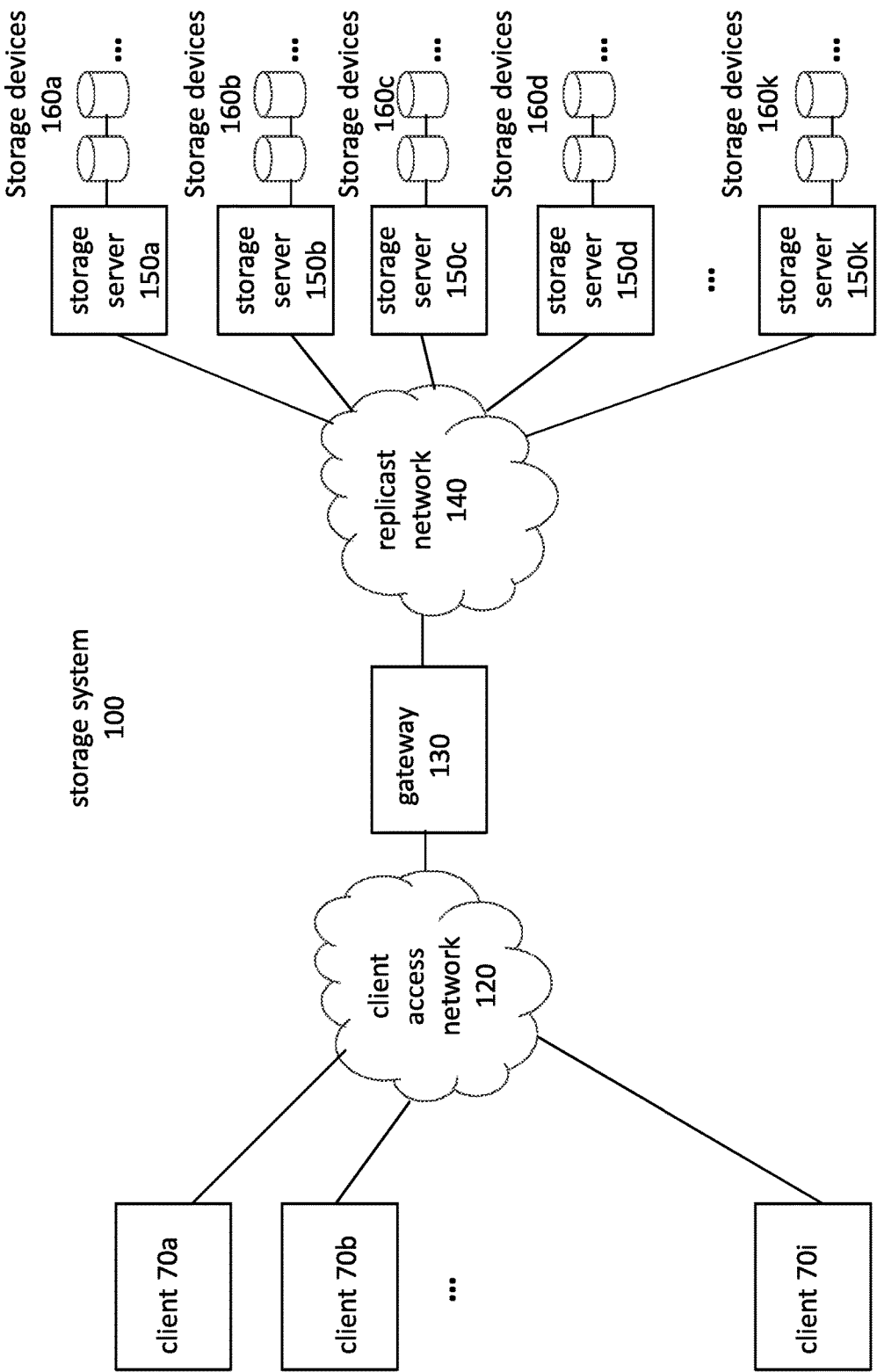
FIG. 1 depicts a storage system described in the Incorporated References.
Figure 2:
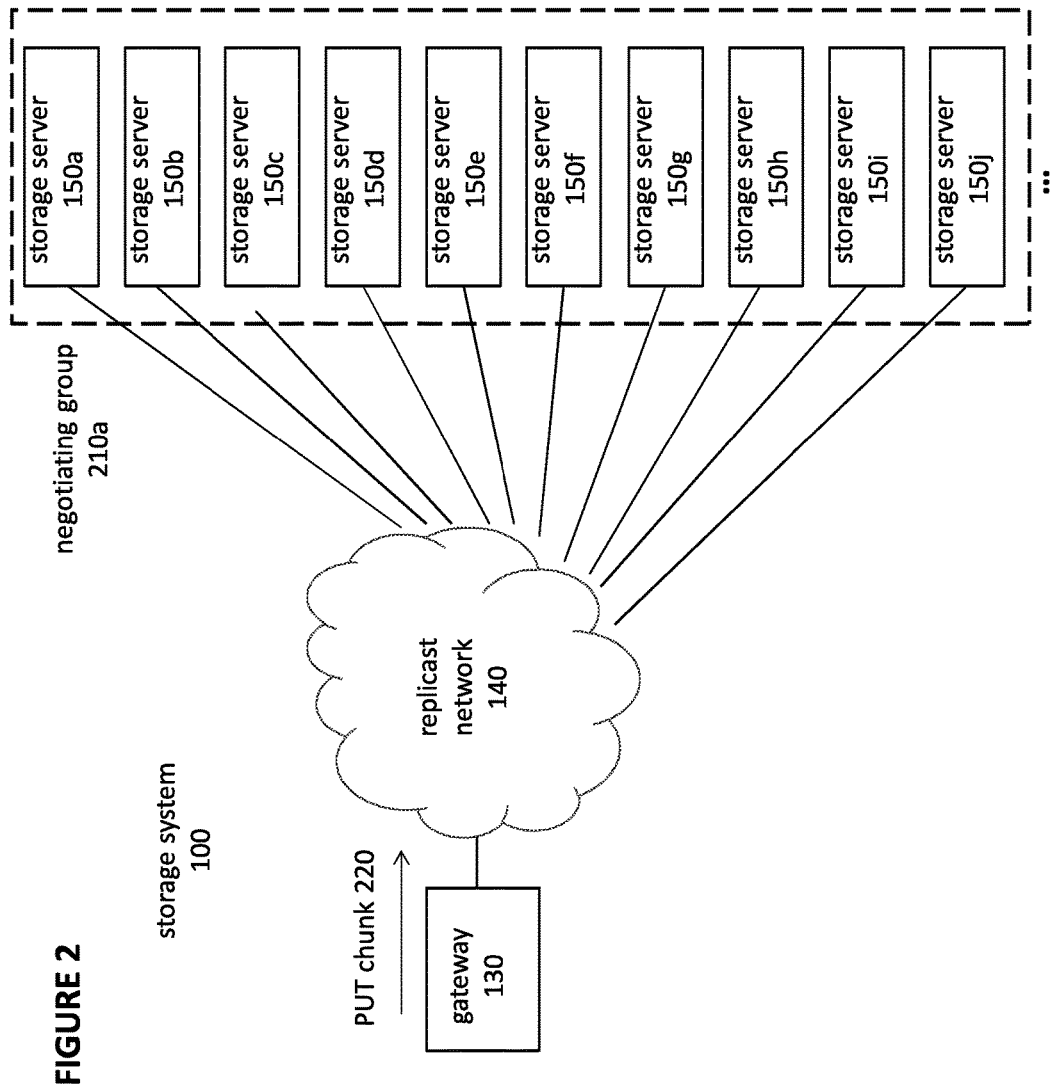
FIG. 2 depicts a negotiating group comprising a plurality of storage servers.
Figure 3:
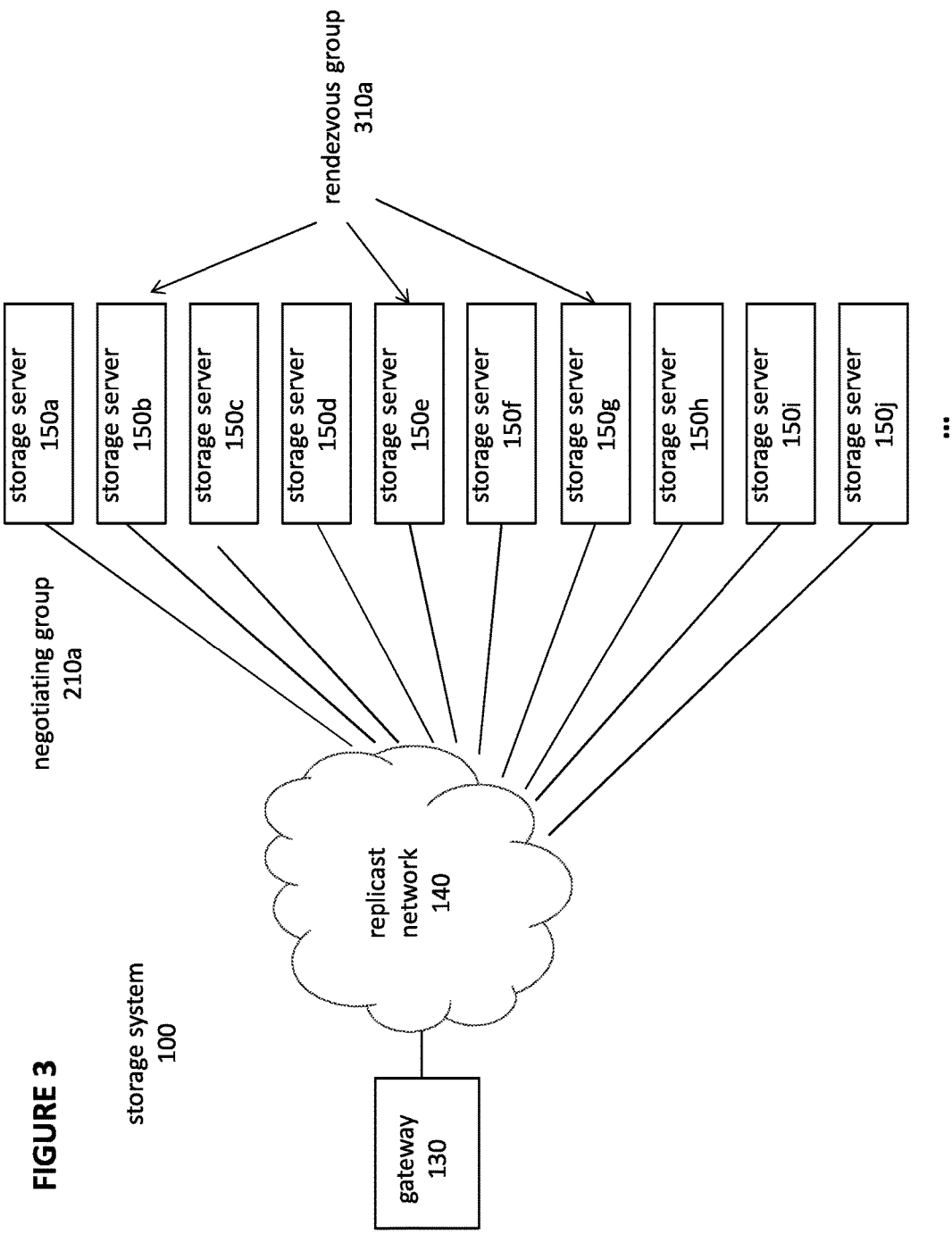
FIG. 3 depicts a rendezvous group formed within the negotiating group.
Figure 4:
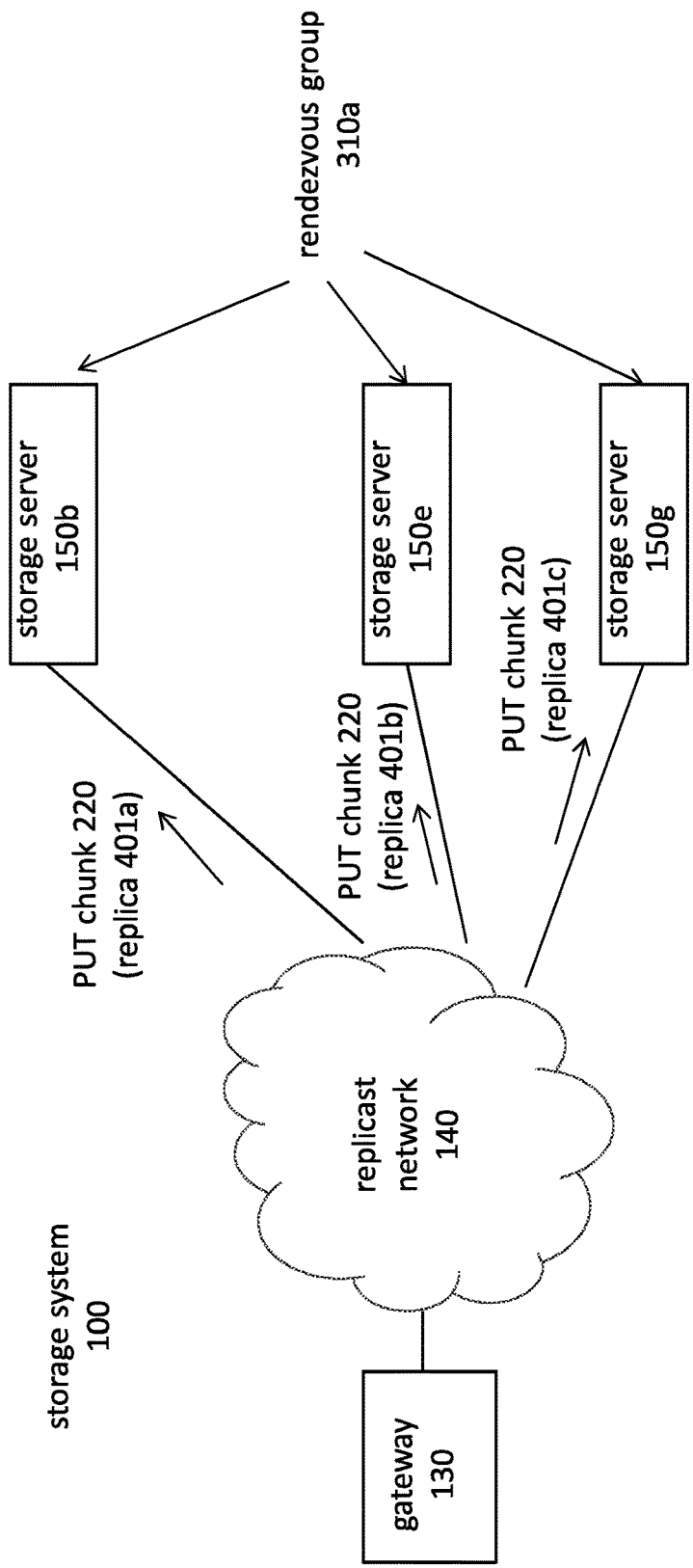
FIG. 4 depicts a put transaction of a chunk to the rendezvous group.
Figure 5:
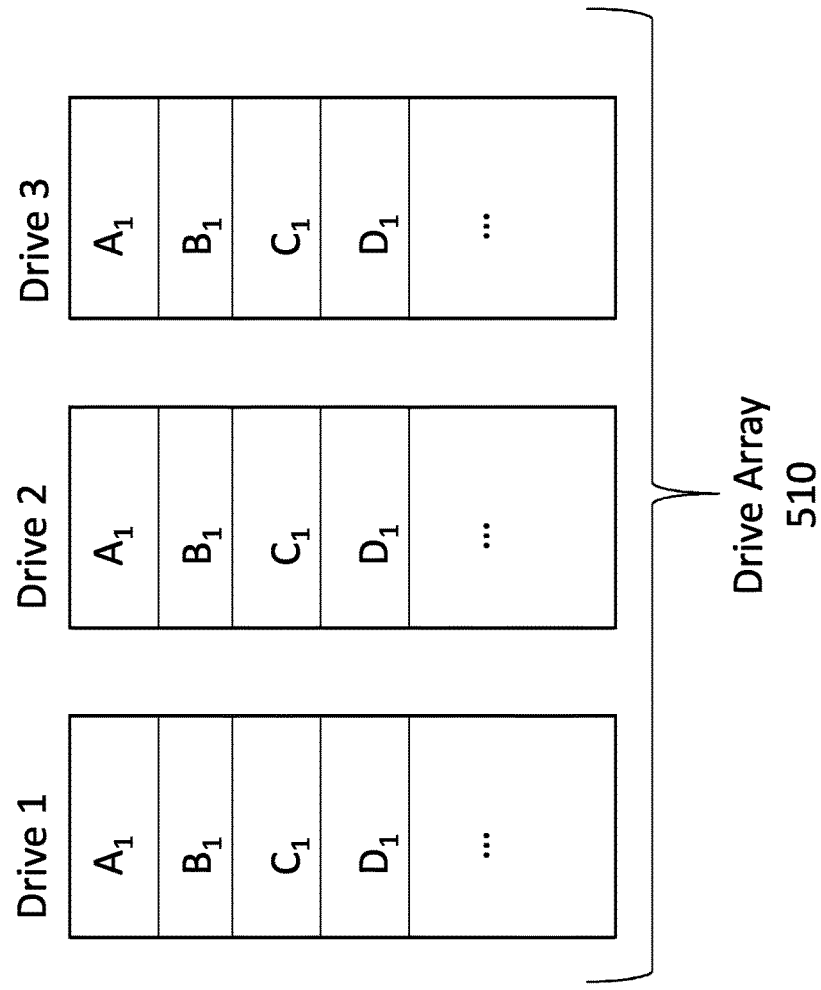
FIG. 5 depicts a prior art replica system.
Figure 6A:
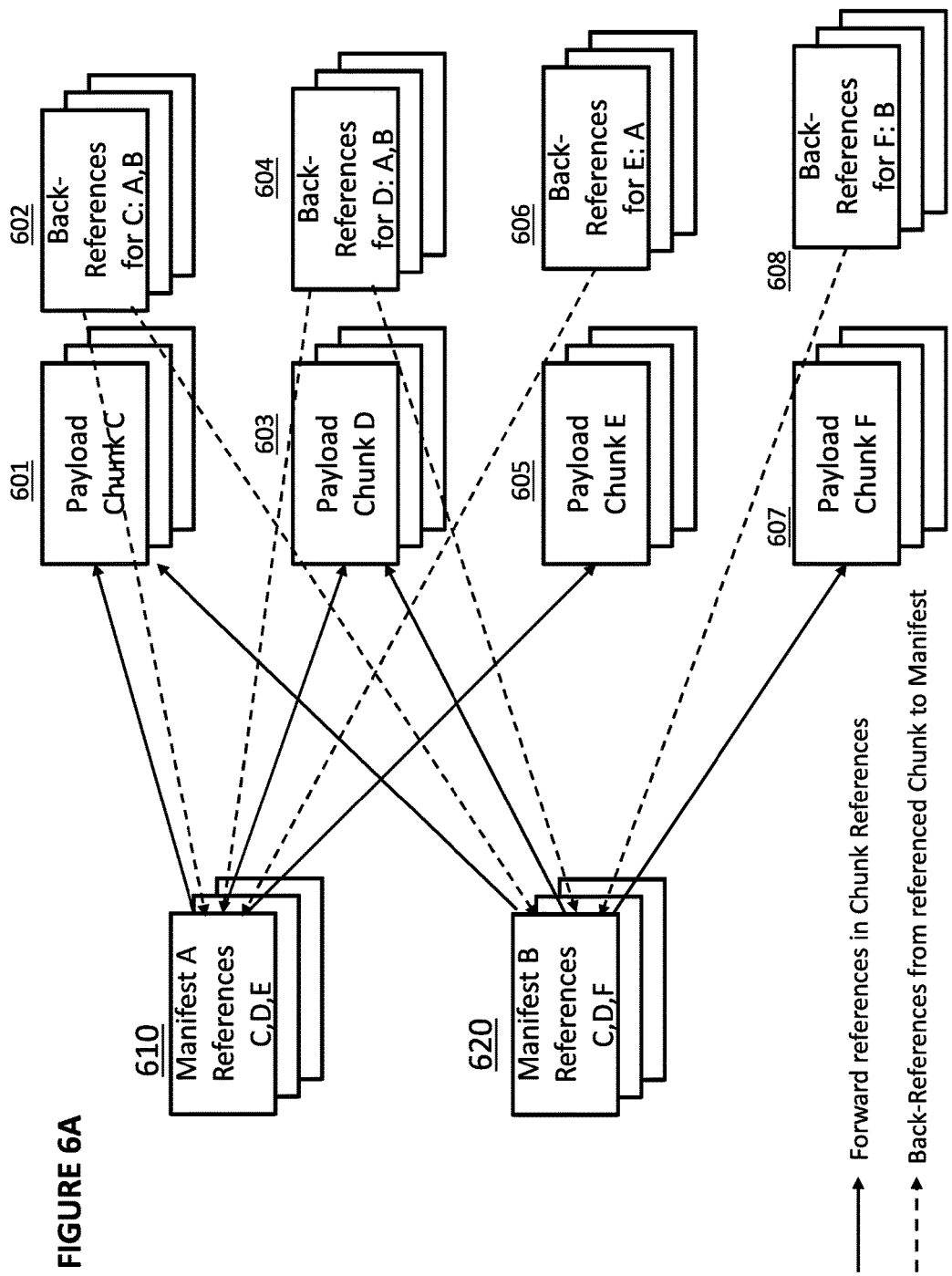
FIGS. 6A, 6B, and 6C depict a replica system that transitions to a parity system and back to a replica system, as described in the Manifest Striping Application.
Figure 6B:
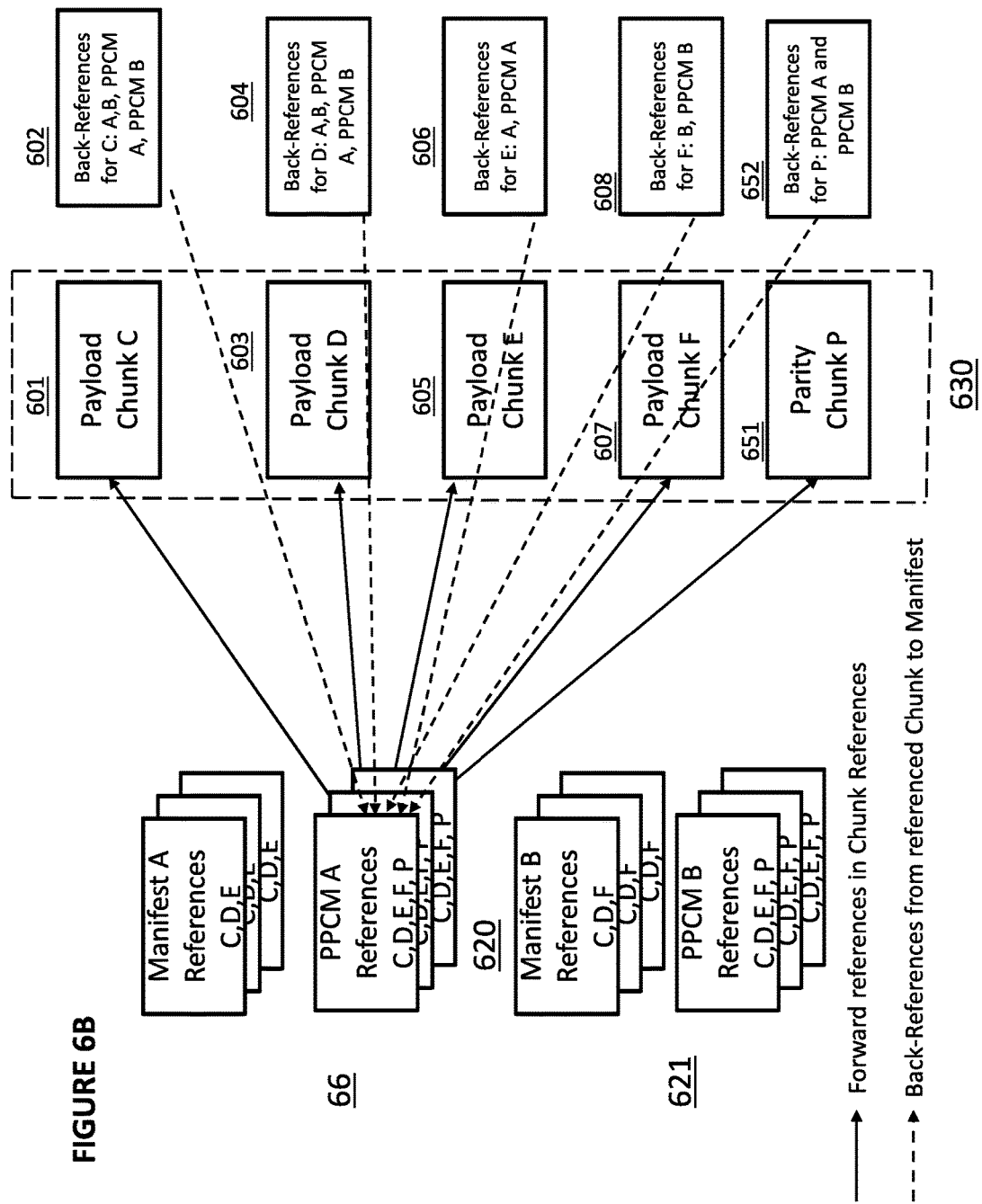
Figure 6C:
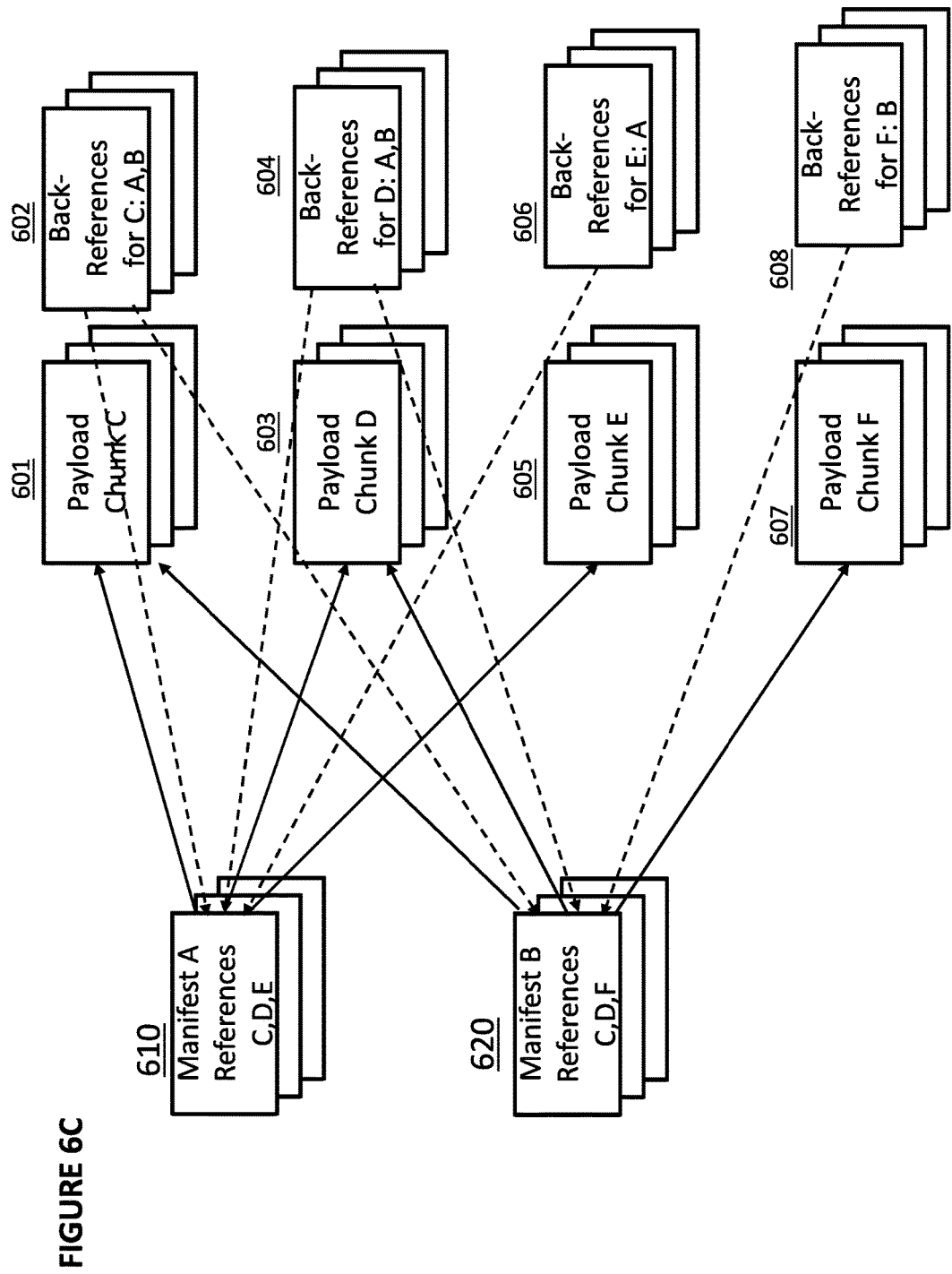

Dependency Set: The set of Failure Domains within a negotiating group that a PPC is dependent upon.

Eligibility Set: the set of failure domains which will produce no conflicts if a PPC is selected which already has a member in this failure domain.

Eligibility Set Map: An enumeration of Eligibility Set Maps for each failure domain in the negotiation group other than the one the storage server generating the map belongs to.

Failure Domain: an integer identifier associated with each storage server. Storage servers with the same Failure Domains are presumed to be at greater risk of concurrent failure. The storage cluster seeks to avoid loss of data should all storage servers in a single failure domain concurrently become unavailable.

Failure Domain Map: A map maintained by a storage target that tracks the assignment status for each failure domain within a negotiation group for an Open Parity Protection Chunk.

Manifest Chunk: An immutable chunk storing metadata and references to other Manifest Chunks or Payload Chunks. Manifest Chunks are not eligible to be a protected chunk.

Open Parity Protection Conglomerate: A parity protection chunk that is typically cached by the storage target that hosts it which still has failure domains that are open to accepting new protected chunks.

Parity Protection Conglomerate (PPC): A key-value tuple stored by a storage server which is comprised of a manifest portion enumerating the protected chunks and a payload portion which is the result of applying the specified algorithm (typically XOR) to the payload of all of the protected chunks.

Parity Protection Conglomerate Identifier (PPCID): A persistent local identifier for the current Parity Protection Chunk providing parity protection for an expanding set of payload chunks. The identifier remains constant even when a new Parity Protection Chunk is recalculated to include each additional protected chunk.

Parity Protection Chunk Manifest (PPCM): The method of describing parity protection sets used in the Manifest Striping technique that is offered as a comparison to the present invention. The present invention embeds a self-describing manifest inside of each Parity Protection Chunk rather than relying on an external manifest.

Payload Chunk: An immutable chunk storing records or bytes.

Protected Chunk: A payload chunk that can be recovered using a Parity Protection Chunk (PPC) and the payload of other chunks protected by the same parity protection chunk.

DETAILED DESCRIPTION OF THE PREFERRED EMBODIMENTS

The present invention discloses a system and method for creating multiple Parity Protection Conglomerates (PPCs) protecting payload chunks in a distributed storage cluster. The PPCs are created without requiring any additional network transmissions beyond those that would have created an equivalent number of whole replicas using multicast transmission.

Typically, the embodiments disclosed herein reduce the storage required from three independent replicas to a single replica and two PPCs which are combined to provide protection for N protected chunks. The two PPCs are not replicas of each other. To the contrary, they are required to protect otherwise disjoint sets of payload chunks. If the number of protected chunks assigned to each PPC is 5, the storage efficiency is increased from 33% (1 byte of user supplied data require 3 bytes of stored data) to 71% (5 bytes of user supplied data require 7 bytes of stored data).

Both put and get transactions in these embodiments are extensions of the protocol disclosed in the Replicast Application.

Figure 7:
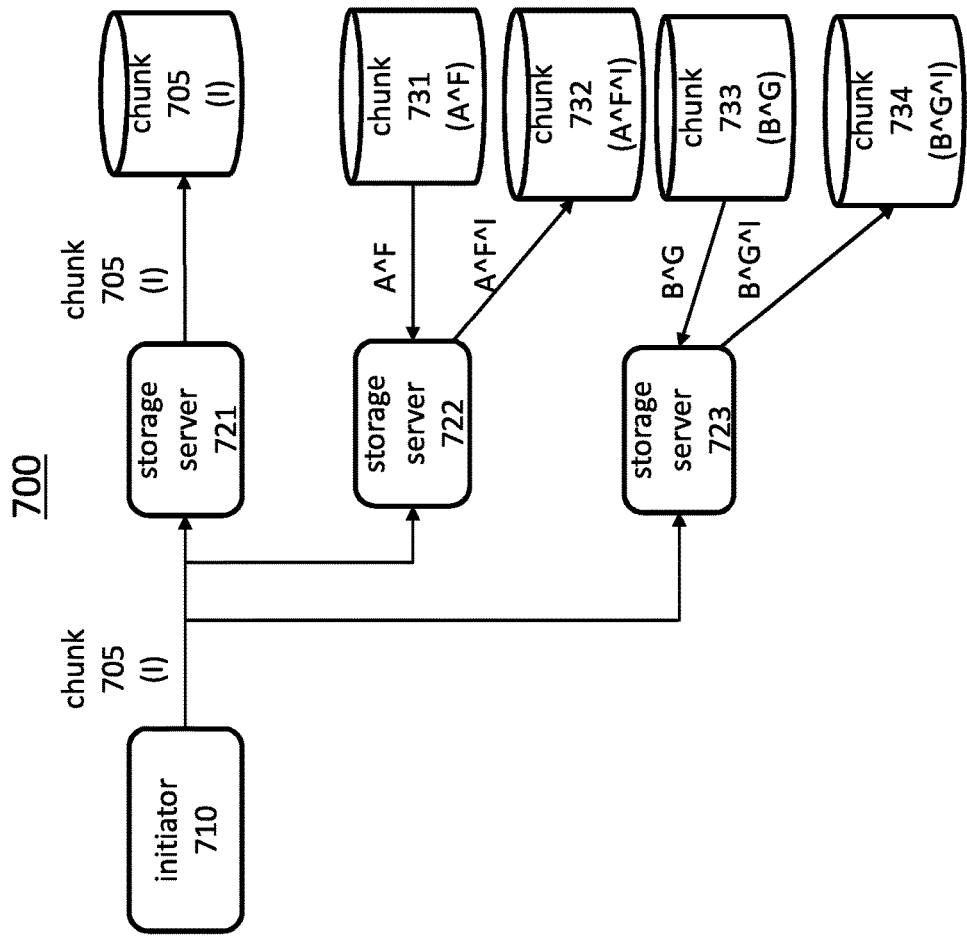
FIG. 7 depicts the creation of a whole replica and two different PPCs from a multicast transmission of a chunk.

FIG. 7 depicts multicast parity-protected RAID system 700. System 700 comprises initiator 710 and storage servers 721, 722, and 723. In this example, initiator 710 sends a put command to store chunk 705 (also labeled chunk I). Storage servers 721, 722, and 723 each receive the multicast transmission of chunk 705, but in accordance with the present invention, act upon it differently based upon their assigned roles.

The designated primary storage server simply stores the whole chunk, as previously disclosed in the Replicast Application and the KVT Application. The preferred implementation extends the get and put transactions described in the Replicast Application. The local encodings of retained data and supporting indexing are extensions of the local encoding disclosed in the KVT Application.

In this example, storage server 721 has been designated as the primary storage server, and it stores chunk 705 in its entirety.

In accordance with the present invention, data chunks (such as chunk 705) are protected from loss using parity protection conglomerates (PPC). Each PPC is managed by the storage server that hosts it.

Each PPC comprises a manifest portion and a payload portion. The manifest portion enumerates the chunk identifiers of a set of chunks that this PPC protects. The payload contains the product of the payload of those same chunks. This is typically an XOR product, but any Galois transform can be used.

For example, the PPC manifest can enumerate the chunk identifiers of the protected chunks A, B and C, and the payload portion would hold A+B+C or A^B^C (where "+" or "^" indicates the communicative Galois transformation selected).

Thereafter, a PPC may be used to recover any missing member of the protected set given the surviving members. For example, the following recoveries can all be performed:

(A+B+C)+B+C→A
(A+B+C)+A+C→B
(A+B+C)+A+B→C

Under the present invention a storage server is assigned to provide specific protection for a given chunk in a PPC. The storage server selects the PPC to add the newly protect chunk to on its own subject to constraints which prevent overlapping failure domains across PPCs protecting the same chunk which that server will select itself. When the new payload is received it is applied to the selected (potentially already existing) PPC to produce a new PPC that has added the new chunk to the list of protected chunks.

With reference again to FIG. 7, storage servers 721, 722, and 723 each receive chunk 705 (chunk I). Storage server 721 stores chunk 705 as received. Storage servers 722 and 723, which have been designated to provide parity protection, combine the existing data that they were protecting prior to the put operation of chunk 705—i.e., PPC 731 (A+F) for storage server 722 and PPC 732 (B+G) for storage server 723—with the new chunk I to form a new PPC—i.e., PPC 732 (A+F+I) for storage server 722 and PPC 734 (B+G+I) for storage server 723. Storage server 722 then stores PPC 732 (A+F+I) and storage server 723 stores PPC 734 (B+G+I).

Under the protocol disclosed in the Replicast Application, a gateway will multicast an "accept" message that schedules the rendezvous transfer. The present invention extends that message to also assign a specific non-default role to each storage servers not assigned to hold a whole replica. As will be explained, the storage servers assigned to provide parity protection avoid undesirable overlapping membership in their self-managed PPCs by basing the PPC membership on the role assigned.

Creating multiple PPCs protects against the concurrent loss of N storage servers. Most deployments will find it advantageous to limit N to two, as that the marginal benefit of protecting against concurrent loss of 3 or more storage servers is minimal compared to the cost of doing so.

Protection Against Multiple Losses

Figure 8:
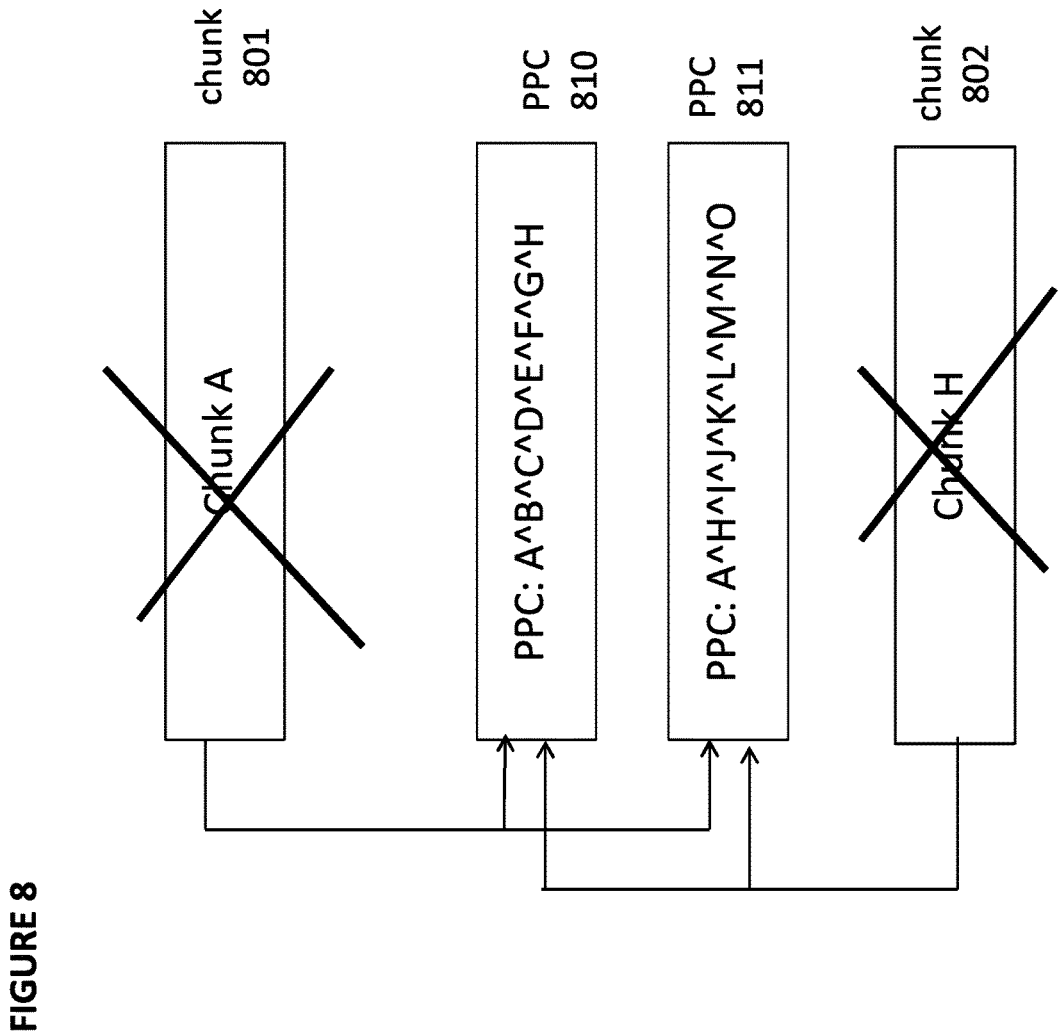
FIG. 8 depicts the reason why two PPCs, without further restrictions, are insufficient to guard against the loss of two chunks.

FIG. 8 depicts chunk 801 (also labeled Chunk A) and chunk 802 (also labeled Chunk H). Chunks 801 and 802 both are protected by PPC 810 and PPC 820. FIG. 8 illustrates why merely having two PPCs, with no restrictions, will not provide sufficient protection against the concurrent loss of two storage servers. In the example illustrated, the concurrent loss of the servers holding the primary replicas for chunks 801 and 802 will leave PPCs 810 and 820 useless because of overlapping protection in the PPCs as to chunks 801 and 802. All that can be recovered from PPCs 810 and 820 in that scenario will be A+H. Surviving chunks B, C, D, E, F and G can recover A+H from A+B+C+D+E+F+G+H (PPC 810), and surviving chunks I, J, K, L, M, N and O can recover A+H from A+H+I+J+K+L+M+N+O (PPC 820). However, with the primary replicas for both A and H lost, the cluster no longer has sufficient information to recover the original payload of either A or H.

However, even if we limit two PPCs to containing only a single overlapping protected chunk, the cluster still will be vulnerable to the concurrent loss of two failure domains. For example, if one PPC protects [A, B, C, D, E] and another PPC protects [A, F, G, H, I], and if E and F are in the same failure domain then, the loss of the storage server storing the replica for A and the failure domain storing the replicas for E and F would prevent recovery of A, E, and F.

The replicast protocol described in the Replicast Application uses multicast messaging to allocate chunks to specific storage servers within a negotiating group, which limits the number of storage servers (and hence failure domains) within the negotiating group to which the chunks will be assigned. With a limited number of relevant failure domains to which any given chunk can be assigned, excessive overlap would be common unless the affirmative steps are taken to prevent excessive overlap.

Figure 9:
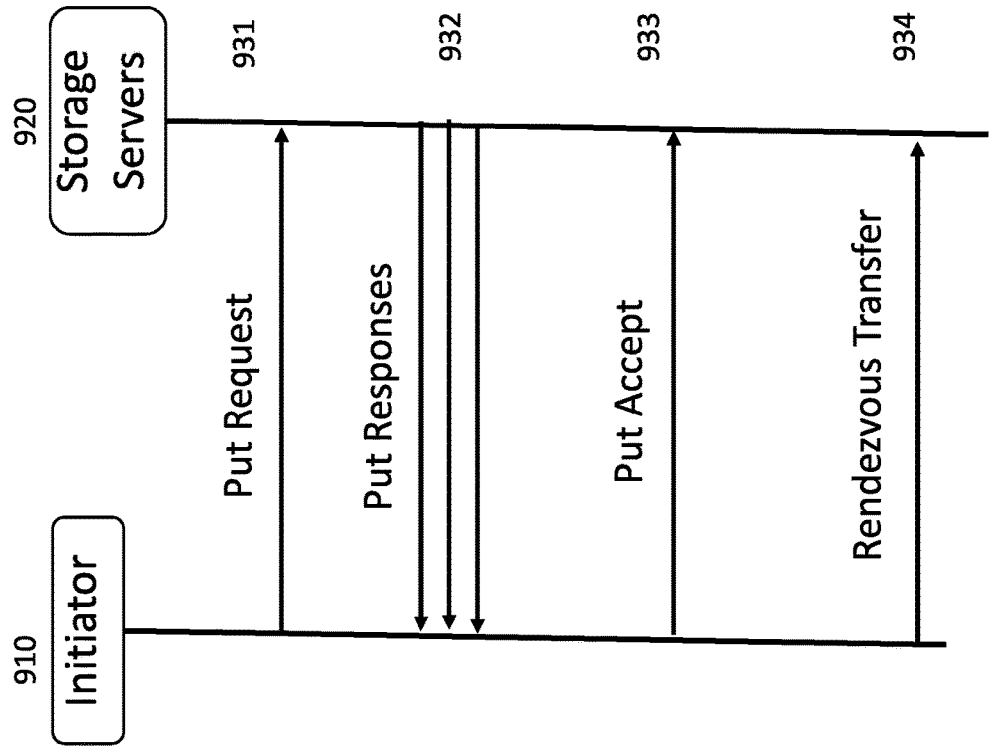
FIG. 9 depicts an extension of the Replicast put transaction that assigns non-conflicting PPCs over the course of the transaction.

FIG. 9 illustrates algorithm 900 to assign a newly protected chunk to a set of distributed PPCs such that the collected set of PPCs have at most one protected chunk for any failure domain. FIG. 9 depicts exemplary initiator 910 and exemplary storage servers 920 that form a negotiating group.

The replicast put transaction, as disclosed in the Incorporated References, is extended as follows:

The put request message is extended to indicate when this put may request PPC creation from one or more members of the negotiating group. This request must also include the maximum number of PPCs that will be assigned to cover this chunk. (step 931).

Each storage server's put response message will identify an Eligibility Set Map. The map specifies an Eligibility Set for each of the other failure domains in the negotiating group. (step 932)

An Eligibility Set is the set of failure domains which will produce no conflicts if a PPC is selected which already has a member in this failure domain.

Each Eligibility Set nominated must identify the PPC that the newly protected chunk would be merged with. Each eligibility set must have sufficient members for the number of PPCs that the put request indicated might be created. This may require identifying a new PPC that as of yet protects no chunks.

A tentative reservation must be created for each identified PPC. Most reservations will be released when the accept message is received or when the transaction times out.

The initiator selects the members of the rendezvous group, and assigns specific roles uniquely to each member of the rendezvous group. This information is included in the extended multicast accept message. The roles must be mutually exclusive. (step 933). The roles may be:

Primary replica: this storage server is to store a whole replica of the chunk.

Primary PPC: this storage server is to merge the received chunk with the identified PPC (one of those it proposed in its put response message) to form a new PPC with the same PPCID.

Other PPC: this storage server is to select an existing PPC which currently only has members of the supplied Eligibility set. If there are multiple storage servers assigned to provide "other PPC" protection, then the Eligibility Set for each must be a disjoint subset of the Eligibility Set provided by the Primary PPC provider.

This results in the creation of a single whole replica and a plurality of PPCs which will have at most the current chunk's failure domain in their set of protected chunks. The initiator is never required to make a selection of which protected chunks will be protected in which PPC.

Figure 17:
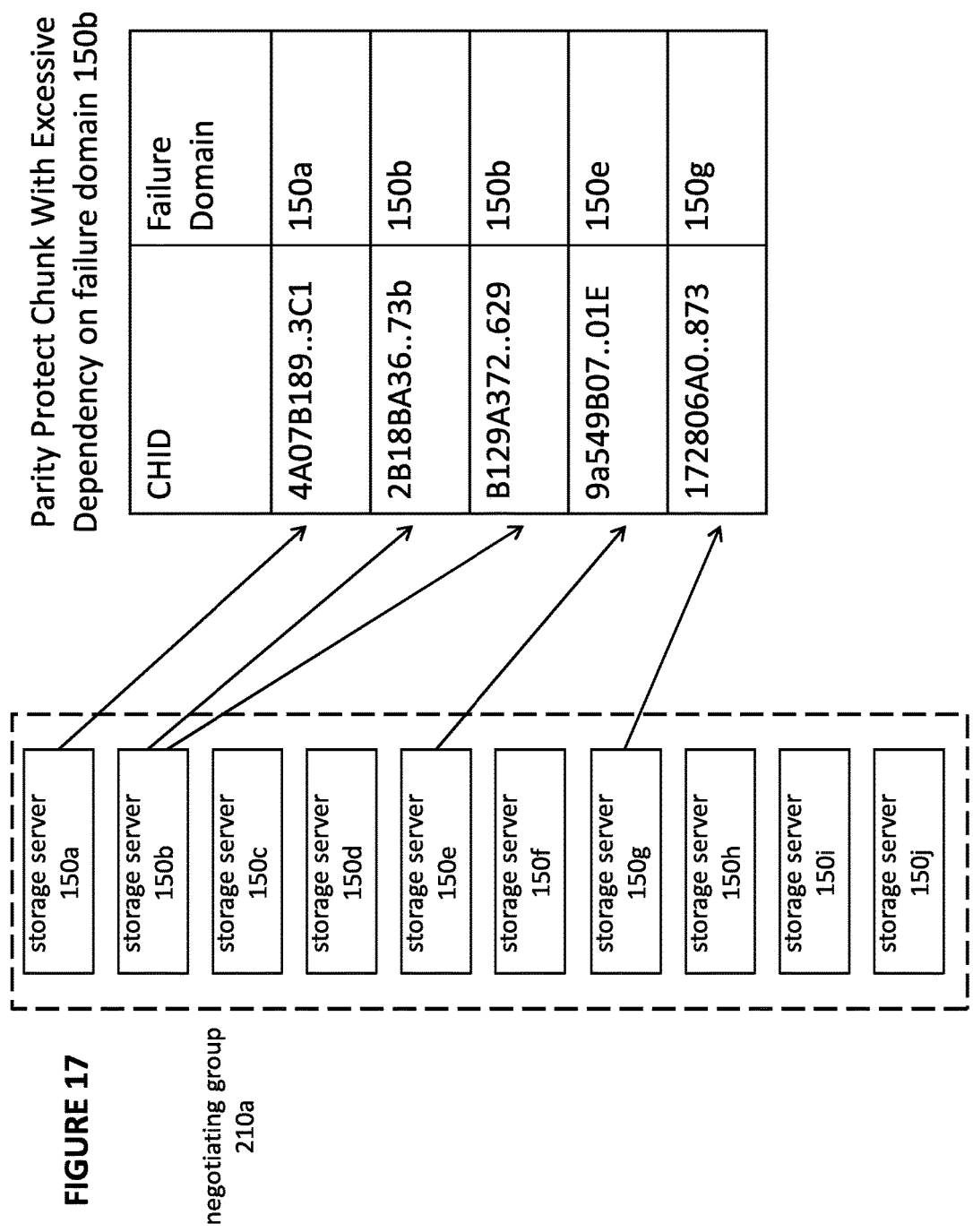
FIG. 17 depicts an example of a Parity Protection Chunk that has excessive dependency on a single failure domain.

FIG. 17 illustrates an example of a PPC that is overly dependent on a single failure domain. In this example, two distinct chunks (with CHIDs 2B18BA36.73b and B129A372 . . . 629) are referenced from the single failure domain 150b. The loss of that single failure domain (150b) will prevent the PPC from being used to reconstruct either of the missing chunks. Thus, a rule is imposed in the preferred embodiments that each PPC may protect at most one chunk from each failure domain within the negotiating group.

Figure 18:
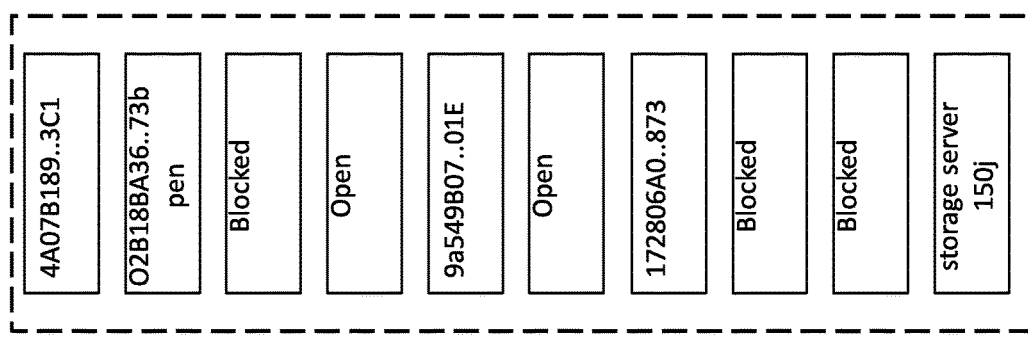
FIG. 18 depicts the Failure Domain Map for an Open PPC as tracked by the storage server that hosts the PPC.

FIG. 18 illustrates exemplary Failure Domain Map 1800 which would be used by storage servers to track each "open" PPC to which they can assign a new protected chunk. The state for each failure domain within the negotiating group can be: it already is protecting a specific chunk (with its CHID), it was blocked from protecting this failure domain by a previous assignment, or it is open to protecting a chunk that is assigned to this failure domain. Examples of each of these states are shown in exemplary Failure Domain Map 1800.

Once the initiator has selected the storage target to hold the primary whole replica, the failure domain to hold the primary parity protection chunk is left with the Eligibility Set specified for the primary PPC (in that server's Put Response). This Eligibility Set is then divided over the remaining parity providers. Each of the remaining parity providers must select an Open PPC that has no entries in its Failure Domain Map which are blocked or have an assigned chunk for an ineligible failure domain. The protected chunk must be entered as being assigned for its failure domain, and the failure domains that are not in the Eligibility Set that were previously open must be marked as blocked.

RAID-Zn Option

As either a supplement or an alternate to identifying non-conflicting parity protection sets, parity generation algorithms can be selected which provide for multiple recovery from a single set of protected chunks. Examples of such algorithms include RAID-Zn, as developed by Sun Microsystems for the ZFS file system, and Erasure Coding schemes using Reed-Solomon, Cauchy or other algorithms. These algorithms allow multiple protection stripes to recover from the loss of two or more storage devices.

Multiple protection for a single set of protected chunks can be used instead of or in addition to the use of non-conflicting sets.

Figure 10:
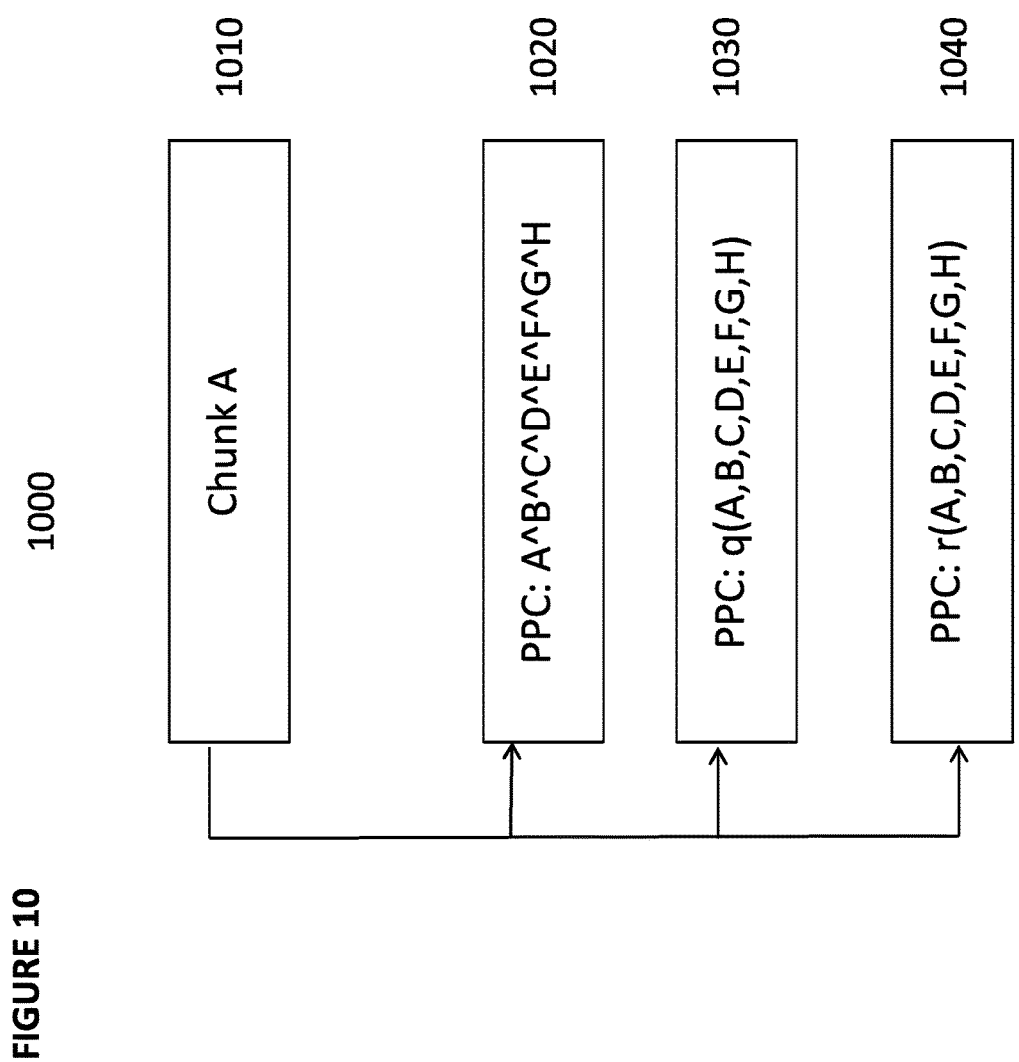
FIG. 10 depicts the application of RAID-Zn algorithms to protecting against multiple concurrent chunk loss.

FIG. 10 illustrates exemplary multiple parity algorithm 1000, which provides for recovery from the loss of 2 or 3 chunks within a single set of protected chunks. The initiator directs different parity protection providing storage servers to use the same set of protected chunks but to generate the PPC using different algorithms. For example, using RAID-Z3 to protect against the loss of 3 storage servers would require assigning the p, q and r algorithms to three different storage servers. The labels "p", "q" and "r" are used in the open-source implementation of RAID-Zn. The "p" algorithm is a simple XOR, while "q" and "r" are more complex Galois transformations. Lary also cites the second parity algorithm for RAID-6 as "Q", as does the Linux kernel documentation for its software RAID-6 algorithm (https://www.kernel.org/pub/linux/kernel/people/hpa/raid6.pdf).

Here, chunk 1010 is protected by one storage server as PPC 1020 using the p algorithm, by a second storage server as PPC 1030 using the q algorithm, and by a third storage server as PPC 1040 using the r algorithm.

An initiator specifying the use of a specific set of protected chunks could also specify the use of any non-default algorithm (more than simple XOR). The payload of each new protected chunk would then be combined with the existing PPC using the specified algorithm.

Parity Protection Chunk Permanent ID (PCCID)

Figure 11:
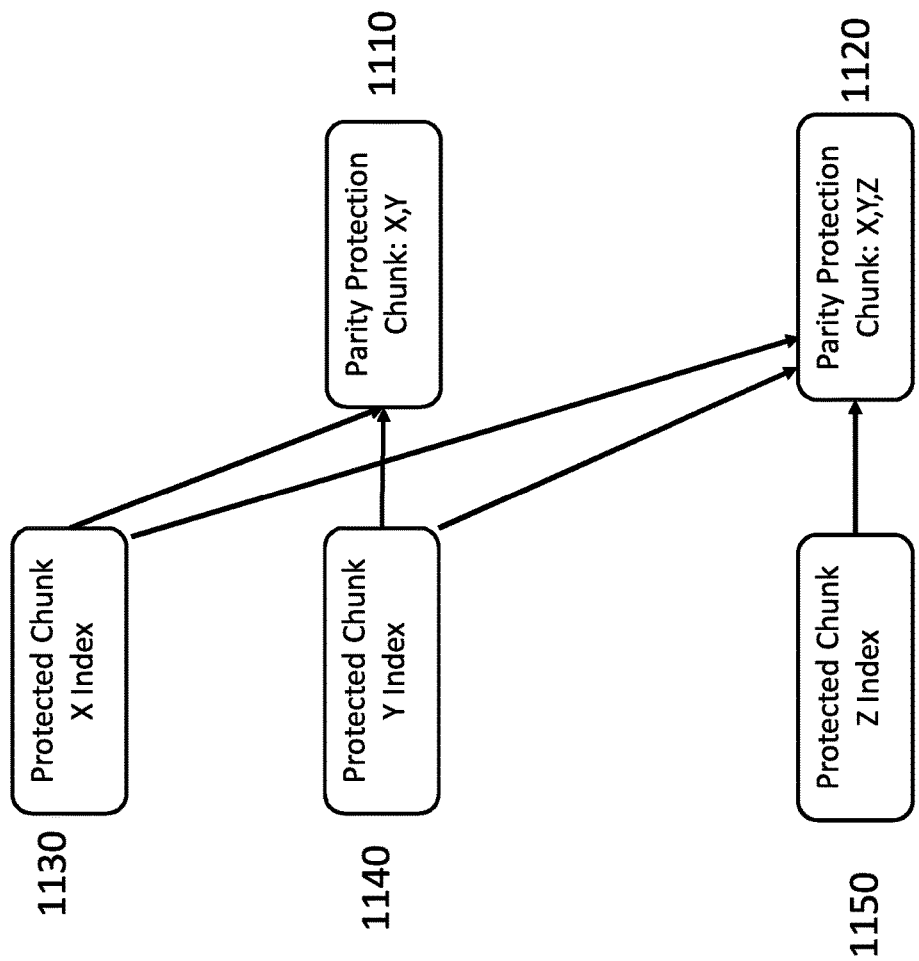
FIG. 11 depicts the challenge of updating multiple protected chunk index entries to refer to the new parity protection chunk covering the whole set.

FIG. 11 illustrates the issue of indexing a PPC for multiple protected chunks when the storage servers are using a copy-on-write strategy.

In the example illustrated, scenario 1100, PPCID 1130 and PPCID 1140 already reference PPC 1010 protecting chunks X and Y. When a new protected chunk Z is received, a new PPC 1020 with payload for X+Y+Z is created by applying the selected algorithm to (X+Y) and Z. The challenge is to have the protected chunk indexes for protected chunks X, Y and Z (1130, 1140 and 1150) all refer to PPC 1020. This must scale even if the number of already-referenced chunks is considerably larger than 2.

Figure 12:
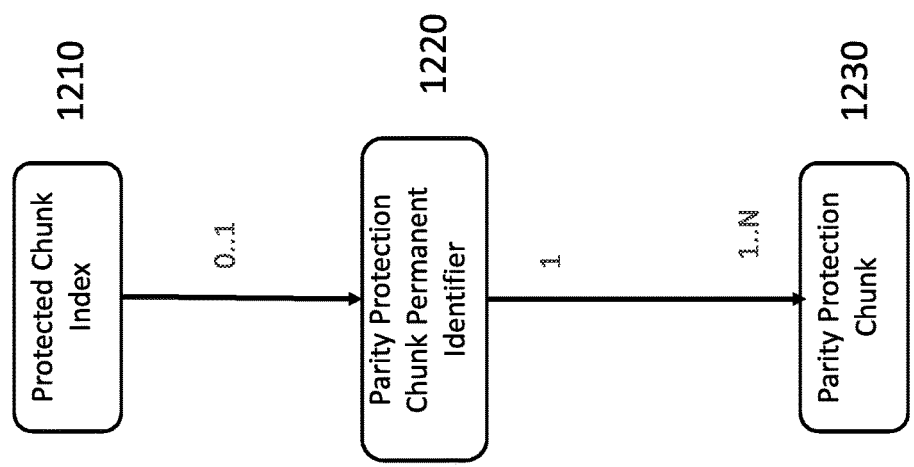
FIG. 12 depicts the use of Parity Protection Chunk Permanent IDs to avoid the need to update multiple protected chunk index entries when protecting a new chunk.

FIG. 12 illustrates solution 1200 to the issue illustrated in FIG. 11. Protected Chunk Index 1210 maps to PPCID 1220. PPCID 1220 then maps to PPC 1230.

Figure 13:
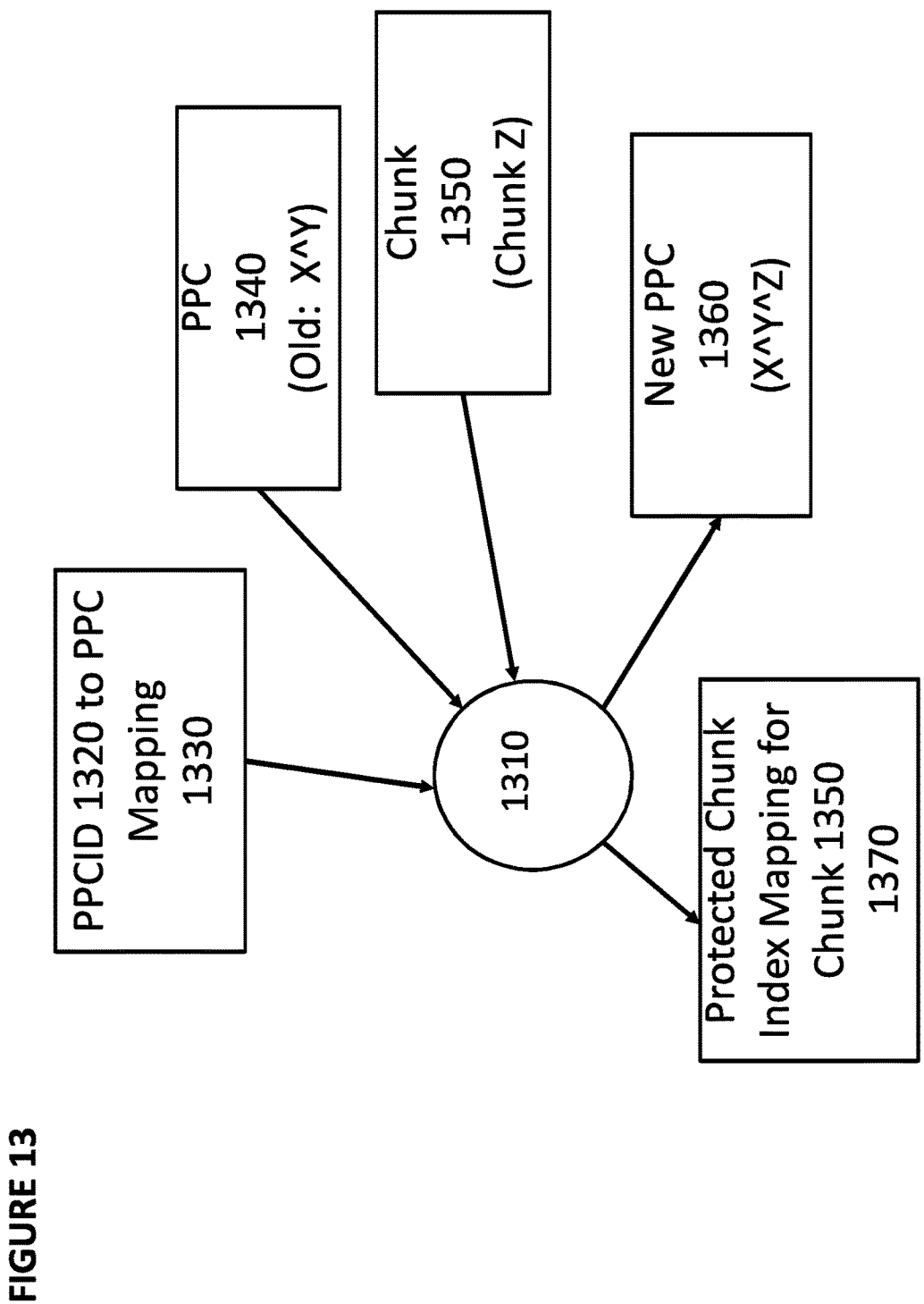
FIG. 13 depicts the application of a multicast chunk by a storage server to create a new PPC based upon the current PPC for the specified PPCID.

FIG. 13 illustrates how a storage server 1310 processes receipt of a chunk 1350 (chunk Z), which is to be merged (as part of a put transaction) with an existing PPC 1340 (X+Y) associated with a PPCID 1320 to PPC mapping 1330:

The new PPC 1360 is written. It now has content for (X+Y+Z).

PPCID 1320 to PPC mapping 1330 is updated to reference the chunk ID for new PPC 1360.

The protected chunk index mapping 1370 for the newly protected chunk 1350 (Z) is written to reference PPCID 1320. No change is required to the protected chunk index entries for chunks X or Y as that they still reference PPCID 1320.

Storage Server Local Encoding of PPCs

Figure 14:
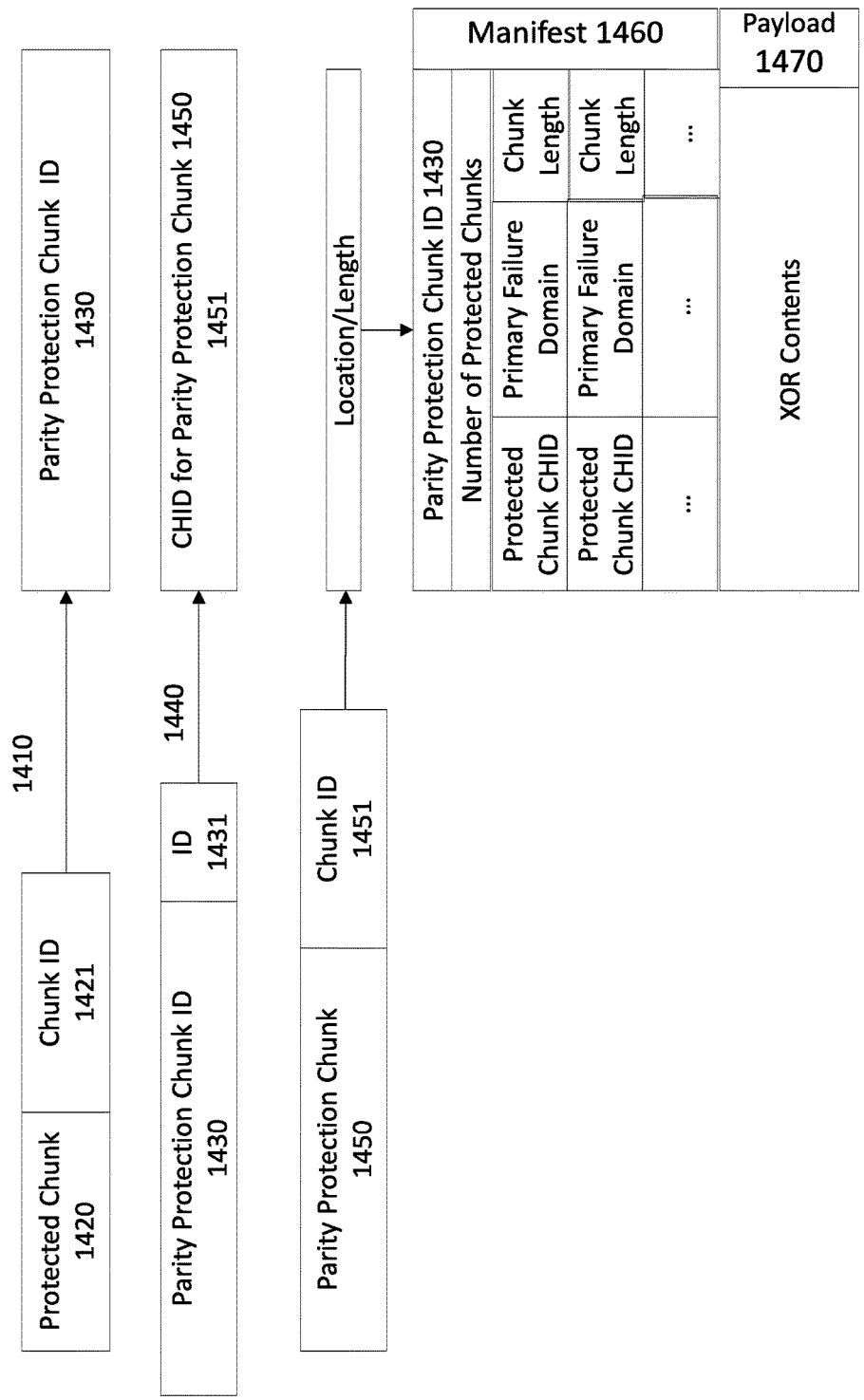
FIG. 14 illustrates the application of Key Value Tuples to encode the protected chunk index, parity protection chunk permanent IDs and parity protection chunks.

FIG. 14 illustrates the local encoding on each storage server providing parity protection storage using the multiple Key-Value-Tuple (KVT) technique as previously disclosed in the Incorporated References. The KVT strategy indexes contiguous local storage by the concatenation of a type and a cryptographic hash which yields a value that is either a short in-line record or a reference to the length and location of local storage.

A protected chunk index KVT 1410 maps chunk ID 1421 of protected chunk 1420 to PPCID 1430.

Another KVT index entry 1440 maps PPCID 1430 to the chunk ID 1451 of PPC 1450. A KVT for PPC 1450 maps chunk ID 1451 to the location and length of PPC 1450 stored persistently. The contents of PPC 1450 comprises two portions: manifest portion 1460 and payload portion 1470. Payload portion 1470 contains the product of the protected chunks' payload (e.g., X+Y+Z). Manifest portion 1460 comprises:

PPCID (Parity Protection Conglomerate Permanent ID) 1430. Readers validate that the correct PPC 1450 has been found by comparing PPCID 1430 with the path followed to reach the PPC.

An enumerator specifying the parity algorithm used. XOR is the default algorithm.

The number of protected chunks. When the present invention is used with the Replicast protocol as described in the Incorporate References, this is at most the number of failure domains within a negotiating group (i.e., each protected chunk in a PPC must be from a different failure domain).

For each protected chunk:
  The protected chunk ID (CHID).
  The primary failure domain where the whole replica of the chunk was last known to reside.
  The original length of the chunk, which is needed when a chunk's length is less than the length of the combined payload. The combined payload will have the size of the largest protected chunk.

The payload portion 1470 contains the results of applying the protection algorithm to all of the payload of all of the protected chunks.

This encoding supports the different transactional requirements for PPCs:

The same PPC can be referenced for multiple protected chunks.

A new PPC can be generated covering the prior set of protected chunks and a new protected chunk. The PPCID can be updated once to map all prior protected chunks to the new PPC.

Either the manifest portion or the payload portion can be retrieved, as specified in the request.

Note that there is no transaction that needs to retrieve the payload of a PPC based upon the cryptographic hash of the combined payload. An alternate encoding could optimize this by using two different KVT entries. The default implementation prefers to minimize the number of KVT index entries and take the extra step of extracting either the manifest portion or the payload portion from the payload.

Chunk Striping

When multicast deliveries can be addressed to larger multicast groups, the initiators may assign each recipient to store a specific payload and/or parity slice of the chunk. For example, this enables creating erasure coding of a chunk with the data placed in 10 data slices and 4 parity slices. A single multicast transmission can result in 14 different slices being created. Conventional unicasting of each of those 14 slices would consume 140% of the network bandwidth required to multicast the full chunk.

The disadvantage of such a solution is that it requires the multicast delivery to address a larger group. Supporting larger groups requires either a very low latency method of specifying group membership or only supporting a subset of possible combinations. Updating layer-2 forwarding tables can easily be done as a low latency operation. However, the method for doing so is specific to switch model. There are no model-independent low latency protocols for updating layer-2 multicast forwarding tables currently defined.

Put Transaction Creating Target-Managed PPCs

The present invention is applicable to any distributed storage system where a single payload chunk image is sent to multiple storage targets, typically by multicasting, to create whole replicas and/or protect the transmitted chunk in PPCs. This section will describe a put transaction which extends the Replicast put transaction as described in the Incorporated References to add replicas or derivatives to reach the goal of having a single whole replica and a specified number of PPCs protecting the chunk.

In the Incorporated References, a Replicast put transaction includes a "rendezvous transfer" where the initiator multicasts a chunk to a "rendezvous group" that has been selected and/or configured by earlier messaging. This exchange includes an "accept message" which tells the members of the negotiating group which of them are to receive and store the multicast chunk.

The present invention extends that transaction by assigning each member listed in the accept message to a specific role. Different roles specify differing handling of the received multicast chunk. The options for the assigned role include the following:
  Store a whole replica of the chunk. This is the default behavior in the prior disclosures. Typically, at least one target will be assigned this role.
  Combine the data into a PPC as described previously in this document.

The Put Transaction is extended to have the following steps:
  An Initiator transmits an extended Unnamed Put Request via multicasting to a negotiating group. The extended request specifies that this transaction may call upon storage targets to merge the received chunk payload into a PPC. With this option the request must specify the maximum number of PPCs needed to protect this chunk.
  The members of the negotiating group, which as previously disclosed are a subset of the full storage cluster which will typically only contain a small multiple of the typical replication count, each receive the multicast request and generate a Put Response message unicast back to the Initiator which either indicates:
    that the specified chunk is already stored on this storage server, or already protected by a PPC on this storage server, or
    when this storage server could accept a multicast transfer of this chunk payload. There is always a bid response. When a storage server does not want to store a specific chunk it merely offers an undesirable bid (a bid that it knows will lose because its proposed time is too far in the future). The bid response will include additional information to assist the Initiator in target selection, which may include:
      The remaining capacity for new persistent storage on this storage server.
      The failure domain that this storage server has been assigned.
      The Eligibility Map as previously described in this document.
  The initiator then determines whether there are already sufficient replicas or derivatives of the chunk stored to provide the required class of storage, or if not, which additional replicas or derivatives are required. If more replicas are required, it applies a user-defined policy to select the best set of storage server bids to select and the roles to assign to each. This used-defined policy is typically based on the earliest possible transfer, but may also factor load-balancing of total storage capacity. This decision is encoded in a put accept message to be transmitted to the negotiating group which specifies:
    The set of storage targets which will receive the multicast data transfer, and the multicast group on which this transfer will occur (the "Rendezvous Group").
    The assigned role of each selected storage target in processing the received data (to store a replica or to store a PPC).
  At the specified time, the Initiator transmits the chunk payload in a series of unreliable datagrams to the multicast address specified in the accept message (the "Rendezvous Group").
  Each recipient validates the received chunk by calculating the cryptographic hash of the received payload. If this does not match the Chunk ID, the payload is discarded and a negative Chunk Acknowledgement is sent to the Initiator reporting a transmission error. This is unchanged from the disclosure in the Incorporated References.
  Otherwise, the required local storage is created, before a Chunk Acknowledgement is sent. Storing the contents locally may involve storing the whole replica, combining the received data with an existing PPC, or creating a new parity protection permanent identifier referring to a PPC covering only the received chunk.
  If the Initiator does not receive sufficient positive Chunk Acknowledgements, it will either retry the transaction or return an error to the application layer.

Put Transaction with RAID-ZN Option

When the RAID-ZN option is used to create PPCs, it is necessary to create a set of PPCs which protect the same set of chunks but using different algorithms. This may be accomplished by having the accept message assign the target to be a PPC with a specific initiator-chosen PPCID. Each initiator would have a set of unfinished PPCs to which a new chunk could be assigned. Once a PPC is "full," the initiator no longer needs to track the PPCID membership itself.

When this option is used, the role assigned to a storage target must specify:
  The PPCID to identify the existing PPC and the replacement PPC. The PPCID must be under the exclusive control of the Initiator.
  The algorithm to be used to merge the protected chunk with the existing PPC. In the preferred implementation, this would be the "p", "q" or "r" algorithms documented for the RAID-Zn algorithm.

The manifest of the created PPC notes which algorithm was used, therefore the procedures to recover a lost chunk are the same no matter which method was used to create the PPC.

Put Transaction with Erasure Coding Option

When using the erasure coding option, the role assigned to a storage target must specify:
  The erasure coding algorithm used (Reed-Solomon, Gauchy, etc.);
  The erasure coding geometry used (number of data slices and number of parity slices); and
  Which slice of the chunk this storage target should store.

Get Transaction

The present invention requires that a get request be broadcast or multicast to a set of all storage targets which may hold a whole replica of the desired chunk or a PPC protecting it. In response to this message, each storage server will respond indicating one of the following conditions:
  That it has a whole replica of the requested chunk.

That it has a PPC covering the requested chunk.

That it has a specific erasure coding slide of the requested chunk.

That it has none of the above.

As with the already disclosed specification of a get transaction in the Incorporated References when a storage server response offers content, the response will also indicate when the server would be ready to transmit the requested content (which could be the whole payload chunk or the manifest portion of the PPC).

If the initiator receives no responses offering the whole replica, or when the whole replica will not be available for a considerable time, it will request delivery of the PPC manifest. Once it has the PPC manifest it will initiate a rebuild using the PPC as described in the next section.

One exemplary implementation extends the Get Transaction, as disclosed in the Replicast Application as follows:

The Get Response message is extended to allow a response indicating that the storage server could deliver the manifest portion of a PPC covering the requested chunk.

The Get Accept message may select a storage server that offered the manifest portion of a PPC. The resulting rendezvous transfer will deliver the manifest portion of the PPC. It is advantageous for the storage server to cache the payload of the PPC in anticipation of a directed transfer.

The initiator may direct a distributed rebuild wherein any storage server may be directed to send the payload of a chunk, or a PPC, to a target.

Any storage server may be instructed to accept an incoming chunk sent from another storage server which it is to combine, using a specified algorithm, to form a new chunk. This chunk may be designated to be forwarded to another target, or to be stored with the final cryptographic hash of the formed chunk being reported to the rebuild initiator.

Recovering a Lost Payload Chunk

Recovering a payload chunk from a PPC is the same as disclosed for recovering a payload chunk from a PPCM in the Manifest Striping Application, with the exception that:

The protected set of chunks is taken from the manifest portion of the PPC rather than one of those listed in a PPCM.

The payload portion of the PPC is used rather than the Parity Protection Chunk referenced from a PPCM.

Figure 15:
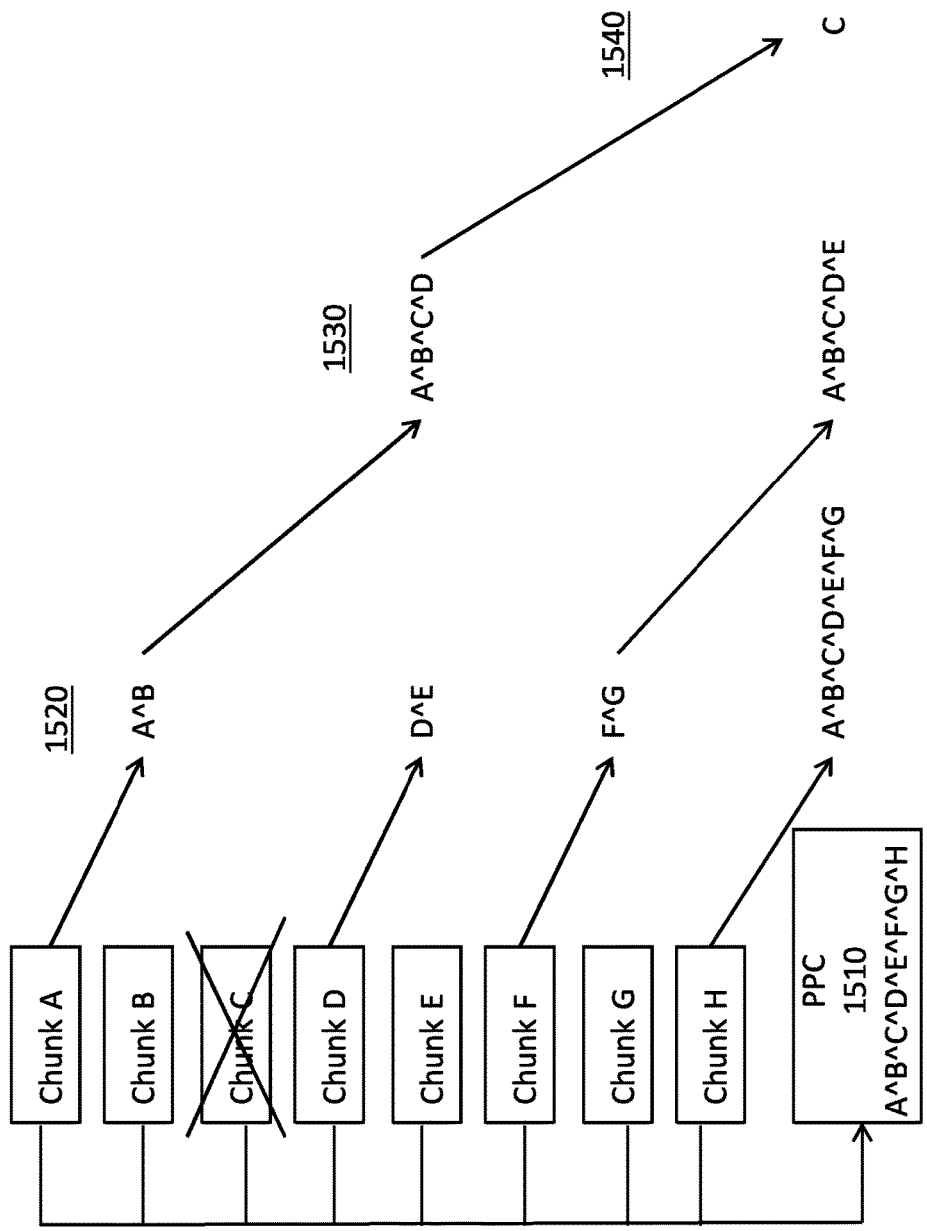
FIG. 15 depicts a parallel reconstruction of a single lost chunk.

FIG. 15 depicts recovery algorithm 1500. In this example, PPC 1510 protects chunks A, B, C, D, E, F, G, and H. In this example, the replica for chunk C cannot be recovered, and PPC 1510 therefore is to be used to recover chunk C. In first stage 1520, pairs of surviving chunks are merged, except that one surviving chunk is merged with PPC 1510. In this example, this results in A+B, D+E, F+G, and A+B+C+D+E+F+G (which results from merging H and PPC). In second stage 1530, pairs of the results from first stage 1520 are merged, resulting in A+B+D+E and A+B+C+D+E. In third stage 1530, the results of second stage 1530 are merged, resulting in C. Recovery algorithm 1500 in this example required eight total transfers over four time periods. Chunk Rebuild considerations.

When a protected chunk is rebuilt it may be disadvantageous to require it be rebuilt in the replacement failure domain. Such a requirement would typically require that the loss payload from a single server be rebuilt on a single server. This would slow the speed of a rebuild.

Rebuilding a chunk in the "wrong" failure domain does not impact the validity of the existing PPCs. The mathematical relationship between the protected chunks and the PPC is unchanged.

However, the probability of losing two chunks at the same time may have been increased. The system should eventually create a new PPC that has a proper failure domain distribution of protected chunks. Faster rebuild of the lost chunks takes priority, however.

While restricting reconstruction to the original failure domain would unduly slow the process of rebuilding a lost server, in many cases it will be possible to assign the new reconstructed chunk to a failure domain which is not referenced in any PPC.

In this case, the manifest portions of the PPCs merely have to be updated to reference the new failure domain for the recreated chunk.

When migrating or rebuilding a PPC itself it is highly preferable to avoid replicating it to any failure domain already referenced in its manifest. There are no changes required to the manifest portion of the PPC because the PPC's manifest does not explicitly state what failure domain it is in.

Removing Protected Chunks

Back references are used for PPCs as with any other chunk.

Figure 16:
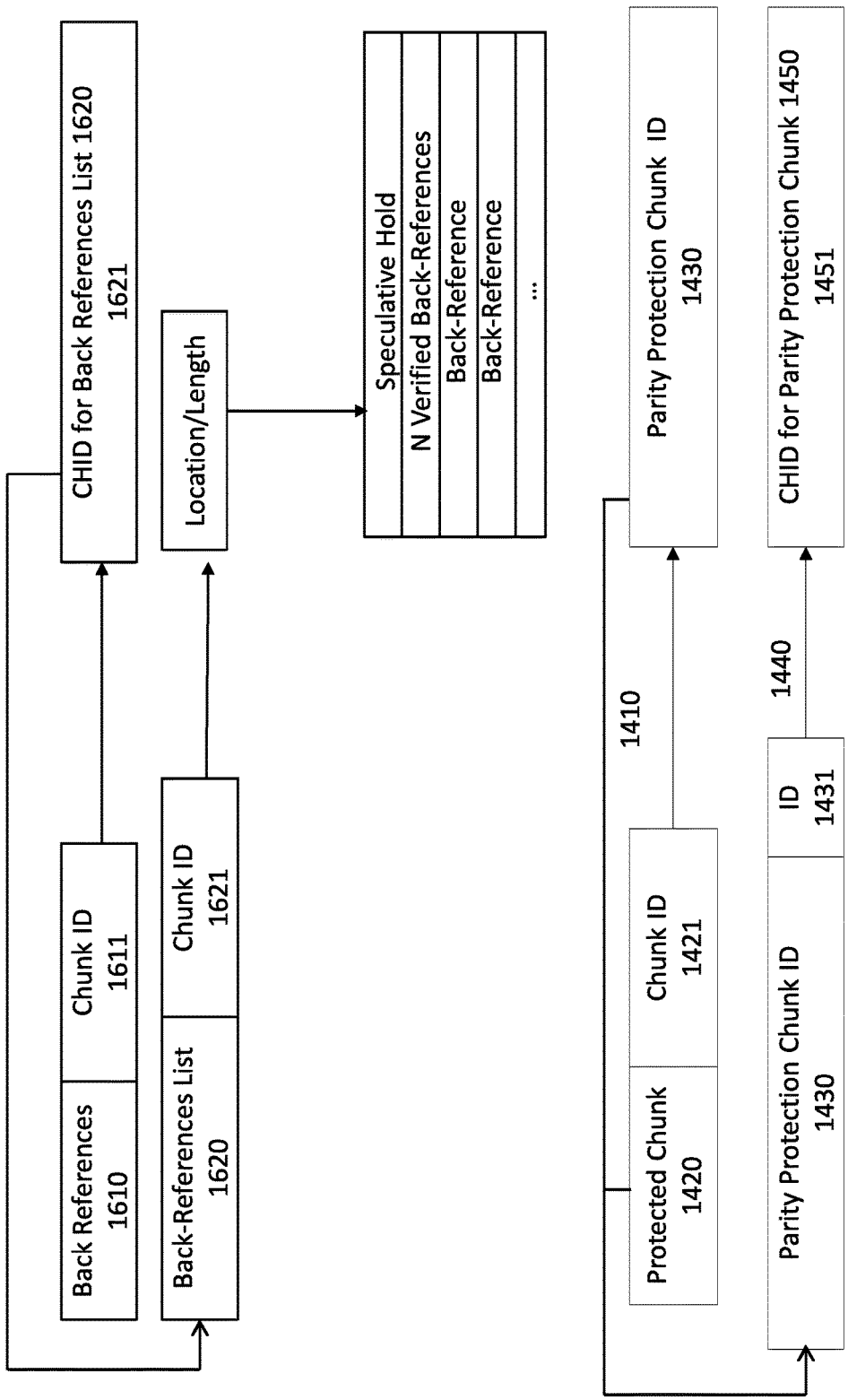
FIG. 16 depicts the Key Value Tuples which track the retention requirement for Parity Protection Chunks.

FIG. 16 depicts the scheme for back references, as discussed in greater detail in the Incorporated References.

Back reference 1610 is associated with a particular chunk identified by chunk ID 1611. Back reference 1610 refers to chunk ID 1621 for back references list 1620. Chunk ID 1621 identifies the location and length of local persistent storage holding back references information, which includes speculative holds, the number of verified back references and the verified back references.

A PPC is retained by a storage server when a PPCID contains a back-reference to that PPC.

PPCIDs are retained as long as they are referenced by Parity Protection KVTs.

Parity Protection KVTs are retained when the whole replica would have been retained. The storage server maintains the same back-reference KVT as maintained for the whole replica.

This method of protection can prevent a chunk from being expunged because it is referenced in a PPC. The following optional procedure describes how to expunge a chunk that is not referenced in a PPC. This procedure can be omitted if merely retaining referenced chunks does not result in an unacceptable amount of orphaned chunks.

To fully expunge a protected chunk:

Perform a special "put expunge" transaction which seeks to identify a rendezvous group of storage servers holding PPCs covering a specific chunk.

Rendezvous groups are selected to include every storage server with a PPC that protects the to-be-expunged chunk. Depending on how rendezvous groups are selected or formed this may require iterations each targeting a subset of the relevant PPCs.

Each rendezvous transfer sends the protected chunk to be expunged to the selected group.

The recipients of the rendezvous transfer will then remove the protected chunk from the PPC as follows:

The designated operation is applied to create a new PPC. With the default XOR algorithm this would take A+B+C+X, remove X resulting in A+B+C.

The number of protected chunks is reduced by one.

The reference to Chunk X is removed from the manifest portion.

The resulting PPC is then put, and its cryptographic hash calculated.

The PPCID is updated to reference the new PPC.

The index entry for the protected chunk is removed.

The chunk put acknowledgement is sent acknowledging that the parity protection for the chunk has been removed.

After a chunk is no longer referenced in any PPC, the normal rules governing its retention, as described for back-references in the Replicast Application, will apply.

In another embodiment, the system can still perform parity protection well after the initial put transaction (as opposed to concurrently). Changing the effective replication count on a Version Manifest can still trigger conversion of the referenced chunks. First, a background put will note that the referenced chunk has N whole replicas rather than 1 whole replica and N−1 PPCs. Second, a rendezvous transfer will then create the PPCs and designate one of the whole replicas to be retained. Third, the other whole replicas are then eligible to be expunged.

Partial Updates

An implementation may optionally combine the technique described in [Frank, 2004] with the present invention as follows:

Update the primary replica of the chunk by sending the partial update to the primary replica. This must create a new chunk which is stored on the same machine using a chunk reference which fixes the Indivisible Negotiating Group.

After applying the update, the primary server responds with the Chunk ID of the updated chunk, and the product of the partial update and the original data.

This data is then multicast to rendezvous group so that each of the other servers can apply the product (new+ old) to their PPC. This new PPC is stored on the same server, and the new PPCID is mapped to the new CHID. The manifest portion of the new PPC is also updated to refer to the new CHID of the protected chunk.

Alternative Implementation without Multicasting

An alternative implementation can apply the same techniques for self-managed PPCs without reliance on multicast negotiations.

In a non-multicast implementation, the initiator first puts the whole replica and then iteratively puts the protected chunk for incorporation with a different PPC. In each step the eligibility set is provided with the protected chunk payload. The targeted server's acknowledgement specifies the eligibility set for the next PPC.

To support such an alternative implementation, the storage server would accept a put request which requested merging a supplied chunk into a PPC. This request would specify the identity of the protected chunk, the payload of the protected chunk, the failure domain where the whole replica was stored and the eligibility set for the selection of an existing PPC to be extended (as previously described). The new PPC is created and indexed as previously described. The acknowledgement must convey the set of failure domains that must be removed from the eligibility set for any next PPC to be created for the same protected chunk.

Such an implementation would need to remember which target had been assigned the primary whole replica so that get transactions would be directed there first. One method of doing so would be to assign the primary replica in the consistent hash algorithm as well as the full set of targets.

The 'first' selection should be distributed by some mechanism for all objects assigned to a specific partition or replication group.

Contrasts with Manifest Striping

The present invention differs from a prior parity protection algorithm described in the Manifest Striping Application n several critical aspects:

In the present invention, each PPC is self-describing. That is, a PPC includes its own manifest describing the chunks the payload was built from. In Manifest Striping, the Parity Protection Content Manifest (PPCM) is created by the initiator and stored parallel to a manifest.

Under Manifest Striping, the set of chunks that a PPC Chunk may reference is constrained to a specific set of manifests (frequently only a single manifest). The present invention forms parity protection conglomerates referencing otherwise unrelated chunks.

The present invention works on chunks, without any special consideration for the difference between manifests versus payload chunks. Manifest Striping creates Parity Protection Chunks created exclusively from payload chunks referenced in an explicitly enumerated set of manifests. The choice of which chunks to create PPCs for is under the control of the initiators.

The present invention is intended to be applied at the time when a put transaction first occurs for a chunk, while Manifest Striping is optimized for deferred migration from multiple replica protection to parity protection.

CONCLUSION

The present invention describes methods to assign protected chunks to parity protection conglomerates in a manner that is compatible with multiple initiators performing concurrent updates. The methods described are all compatible with putting chunks with parity protection on their initial put using only the bandwidth required to transmit the protected chunk once (such as by multicasting the chunk).

These methods still provide the same degree of protection from the loss of storage servers or replicas, but with less storage space required.

What is claimed is:

1. A method for a storage server to create a parity protection conglomerate protecting a received chunk, comprising:

generating a manifest within a parity protection conglomerate, wherein the manifest enumerates: a set of chunks protected by the parity protection conglomerate, including the received chunk; a previously-generated unique chunk identifier for each chunk in the set of chunks; and a failure domain where the primary whole replica of that chunk should be stored, wherein a selection of the parity protection conglomerate by the storage server is constrained such that the created parity protection conglomerate references only chunks contained in failure domains enumerated in an eligibility set specified with a put message;

generating a payload portion of a parity protection conglomerate, wherein the payload portion comprises a Galois transformation of a payload portion of each chunk within the set of chunks, thereby protecting the received chunk as a protected chunk;

updating a local index to map a parity protection conglomerate identifier (PPCID) to the previously-generated unique chunk identifier of the parity protection conglomerate;

generating a protection index entry to map a chunk identifier of the received chunk to the PPCID; and reducing an eligibility set associated with the PPCID to exclude all failure domains that were not contained in the eligibility set specified for the received chunk.

2. The method of claim 1, wherein the Galois transform comprises an Exclusive-OR (XOR) operation.

3. The method of claim 1, further comprising:

initializing, by the storage server, a new parity protection conglomerate with a new PPCID if there are no existing parity protection conglomerates that comply with the eligibility set associated with the first chunk; and generating an eligibility set for the new parity protection conglomerate to include the same failure domains specified in the eligibility set associated with the first chunk without the failure domain containing the protected chunk.

* * * * *